(12) United States Patent
Mori et al.

(10) Patent No.: US 7,563,394 B2
(45) Date of Patent: Jul. 21, 2009

(54) PT/CEO₂/ELECTROCONDUCTIVE CARBON NANO-HETERO ANODE MATERIAL AND PRODUCTION METHOD THEREOF

(75) Inventors: Toshiyuki Mori, Tsukuba (JP); Motoi Takahashi, Tsukuba (JP); Ajayan Vinu, Tsukuba (JP); Chikashi Nishimura, Tsukuba (JP)

(73) Assignee: National Institute for Materials Science, Tsukuba-Shi, Ibaraki-Ken (JP)

( * ) Notice: Subject to any disclaimer, the term of this patent is extended or adjusted under 35 U.S.C. 154(b) by 333 days.

(21) Appl. No.: 11/632,305

(22) PCT Filed: Jul. 14, 2005

(86) PCT No.: PCT/JP2005/013433

§ 371 (c)(1),
(2), (4) Date: Jan. 12, 2007

(87) PCT Pub. No.: WO2006/006739

PCT Pub. Date: Jan. 19, 2006

(65) Prior Publication Data

US 2008/0073619 A1 Mar. 27, 2008

(30) Foreign Application Priority Data

Jul. 14, 2004 (JP) .............................. 2004-206794

(51) Int. Cl.
*H01B 1/16* (2006.01)
*H01B 1/18* (2006.01)
*H01M 8/10* (2006.01)

(52) U.S. Cl. ........................... 252/503; 429/33; 429/44; 429/46; 429/45; 903/908

(58) Field of Classification Search ................. 252/503; 429/33, 44, 46, 45; 903/908
See application file for complete search history.

(56) References Cited

U.S. PATENT DOCUMENTS

| | | | | |
|---|---|---|---|---|
| 5,665,482 A | * | 9/1997 | Mori et al. ..................... | 429/33 |
| 6,753,108 B1 | * | 6/2004 | Hampden-Smith et al. .... | 429/44 |
| 6,967,183 B2 | * | 11/2005 | Hampden-Smith et al. .. | 502/101 |
| 2002/0107140 A1 | * | 8/2002 | Hampden-Smith et al. .. | 502/185 |
| 2003/0004054 A1 | * | 1/2003 | Ito et al. ..................... | 502/178 |
| 2003/0064265 A1 | * | 4/2003 | Hampden-Smith et al. .... | 429/30 |
| 2008/0166605 A1 | * | 7/2008 | Arps et al. ..................... | 429/15 |

FOREIGN PATENT DOCUMENTS

| | | |
|---|---|---|
| JP | 2003-020224 | 1/2003 |
| JP | 2003-080077 | 3/2003 |
| JP | 2004-076084 | 3/2004 |
| JP | 2004-146223 | 5/2004 |
| JP | 2004-197130 | 7/2004 |
| JP | 2004-327074 | 11/2004 |

OTHER PUBLICATIONS

English translation of JP 2004-197130, Jul. 15, 2004.*

* cited by examiner

*Primary Examiner*—Douglas Mc Ginty
(74) *Attorney, Agent, or Firm*—Manabu Kanesaka

(57) ABSTRACT

The conventional Pt/second component/electroconductive carbon type anode materials to be utilized as polymer fuel cell-oriented solid electrolytes and in various sensors have been problematic in several aspects such as activities for oxidizing CO, price, and the like. The present invention aims at providing a Pt/CeO₂/electroconductive carbon nano-hetero anode material that is free of such problems, and a production method thereof. The present invention has been carried out by earnestly and continuously conducting investigations in view of the problems in the related art, and resultingly finding that there can be prepared an anode material which is inexpensive and has an extremely high electrode activity by dispersing an electrode active material on electroconductive carbon, the electrode active material being obtained by first controlling a article size of ceria (CeO₂) to a nano-size and then car in nano-sized Pt on the CeO₂, to thereby narrowly carry out the polymer fuel cell-oriented Pt/CeO₂/electroconductive carbon type nano-hetero anode.

3 Claims, 4 Drawing Sheets

PT/CEO₂/ELECTROCONDUCTIVE CARBON NANO-HETERO ANODE MATERIAL AND PRODUCTION METHOD THEREOF

TECHNICAL FIELD

The present invention relates to a $Pt/CeO_2$/electroconductive carbon nano-hetero anode material to be exemplarily utilized as a polymer fuel cell-oriented solid electrolyte and in various sensors, and a production method thereof.

BACKGROUND ART

Pt/electroconductive carbon anode materials are representative electrode materials to be used as polymer fuel cell-oriented electrode materials. Although such electrodes have exhibited higher electrode activities, they have been subjected to such restriction to necessarily use high purity hydrogen as fuels. It is known that when a small amount of combustible impurity is mixedly present in a fuel to be used for power generation by a fuel cell, the combustible impurity component is combusted on a surface of platinum (Pt) to generate gas components such as carbon dioxide ($CO_2$) and carbon monoxide (CO), such that even an extremely small amount of CO strongly adsorbs onto the Pt surface to considerably deteriorate an activity of the Pt surface (patent-unrelated reference 1).

As such, it has been conventionally considered to use high purity hydrogen as a fuel for a fuel cell. However, it is difficult to keep and utilize high purity hydrogen in homes, thereby bringing about difficulty in widespread use of fuel cell systems.

To solve such a problem, it has been attempted to disperse a metallic element such as metallic ruthenium (Ru), metallic iron (Fe), and metallic manganese (Mn) in a Pt/electroconductive carbon anode material, to thereby adopt a combustible alcohol such as methanol or ethanol as a fuel (patent-unrelated reference 2).

Although much hydrogen and CO are generated on a Pt surface in case of adoption of such alcohol as a fuel, the generated CO is oxidized on the added metallic element such as Ru, Fe, or Mn and converted into $CO_2$, thereby enabling utilization of a fuel cell over a long period of time without deteriorating a higher electrode activity of Pt.

Unfortunately, since Ru metal to be added is expensive, its activity for oxidizing CO is still insufficient, and other inexpensive compounds such as iron oxide, manganese oxide and the like also fail to exhibit activities for oxidizing CO as high as Ru, there has not been practiced an anode material including such Pt/second component/electroconductive carbon yet.

Referenced Literature/Publication:

Patent-Unrelated Reference 1: M. Watanabe, et al., Denki Kagaku, Vol. 38, pp. 927-932, 1970, Electrochemical Society of Japan; and Patent-Unrelated Reference 2: Masahiro Watanabe, Catalysis and Catalyst, Vol. 44, No. 3, pp. 182-188, 2002, Catalyst Society of Japan

DISCLOSURE OF THE INVENTION

Problem to be Solved by the Invention

As described above, the conventional Pt/second component/electroconductive carbon type anode materials have been problematic in several aspects such as activities for oxidizing CO, price, and the like. The present invention aims at providing a $Pt/CeO_2$/electroconductive carbon nano-hetero anode material that is free of such problems, and a production method thereof.

Means for Solving Problem

The present inventors have earnestly and continuously conducted investigations in view of the problems in the related art, and resultingly found that there can be prepared an anode material which is inexpensive and has an extremely high electrode activity by dispersing an electrode active material on electroconductive carbon, the electrode active material being obtained by firstly controlling a particle size of ceria ($CeO_2$) to a nano-size and then carrying nano-sized Pt on the $CeO_2$, to thereby narrowly carry out the present invention.

Namely, the present invention provides technical configurations devised as solving means for solving the above problems, as described in the following items (1), (2), and (3).

(1) A polymer fuel cell-oriented $Pt/CeO_2$/electroconductive carbon type nano-hetero anode material characterized in that the nano-hetero anode material is represented by a general formula:

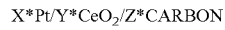
X*Pt/Y*CeO₂/Z*CARBON (where X, Y, and Z are content ratios by weight of platinum Pt, $CeO_2$, and CARBON; $0.1 \leq x \leq 0.4$, $0.1 \leq y \leq 0.4$, and $Z=1-X-Y$; and CARBON represents electroconductive carbon); and that the nano-hetero anode material comprises:

an undoped $CeO_2$ powder including nano-size particles free of components such as rare earth elements dissolved therein in a solid state, wherein the nano-size particles have primary particle diameters between 10 nanometers inclusive and 50 nanometers inclusive and secondary particle diameters between 60 nanometers inclusive and 300 nanometer inclusive, wherein a numerical percentage of spherical particles based on spherical and columnar particles is 50% or more, and wherein the columnar particles have aspect ratios of 20 or less and breadths of 300 nanometers or shorter in minor axis directions;

platinum particles having primary particle diameters of 50 nanometers or less and secondary particle diameters of 300 nanometers or less; and electroconductive carbon as a balance component.

(2) A production method of a polymer fuel cell-oriented $Pt/CeO_2$/electroconductive carbon type nano-hetero anode material characterized in that the method comprises the steps of: in order to attain the nano-hetero anode material having a composition formula:

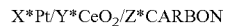
X*Pt/Y*CeO₂/Z*CARBON (where X, Y, and Z are content ratios by weight of platinum Pt, $CeO_2$, and CARBON; $0.1 \leq x \leq 0.4$, $0.1 \leq y \leq 0.4$, and $Z=1-X-Y$; and CARBON represents electroconductive carbon);

firstly preparing a cerium nitrate water solution (having a concentration between 0.5 mole/liter (M) inclusive and 3 mole/liter (M) inclusive), and dropping the water solution into an ammonium carbonate or ammonium hydrogencarbonate water solution (having a concentration between 0.5 mole/liter (M) inclusive and 9 mole/liter (M) inclusive, in either case) heated to a temperature between 50° C. inclusive and 80° C. inclusive, to prepare ceria precursors in the mixed water solution;

holding the mixed water solution for a period of time between 30 minutes inclusive and 48 hours inclusive to separate a ceria precursor powder as solid from liquid, washing the ceria precursor powder in water and then drying it, and calcining the ceria precursor powder at a temperature between 400° C. inclusive and 900° C. inclusive in circulation of oxygen to prepare a crystalline ceria nano-powder; and mixing the obtained ceria nano-powder with a chloroplatinic acid ($H_2PtCl_6 \cdot 6H_2O$) water solution (having a concentration between 0.05 mole/liter (M) inclusive and 1 mole/liter (M) inclusive) and an electroconductive carbon fine powder, drying the mixture by evaporating the solvent in the mixture in circulation of inert gas to obtain a product, and calcining the product at a temperature between 300° C. inclusive and 500° C. inclusive in circulation of hydrogen.

(3) A production method of a polymer fuel cell-oriented Pt/$CeO_2$/electroconductive carbon type nano-hetero anode material characterized in that the method comprises the steps of:

in order to attain the nano-hetero anode material having a composition formula:

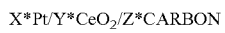

(where X, Y, and Z are content ratios by weight of platinum Pt, $CeO_2$, and CARBON; $0.1 \leq x \leq 0.4$, $0.1 \leq y \leq 0.4$, and Z=1−X−Y; and CARBON represents electroconductive carbon);

firstly preparing a cerium nitrate water solution (having a concentration between 0.5 mole/liter (M) inclusive and 3 mole/liter (M) inclusive), and dropping the water solution into an ammonium carbonate or ammonium hydrogencarbonate water solution (having a concentration between 0.5 mole/liter (M) inclusive and 9 mole/liter (M) inclusive, in either case) heated to a temperature between 50° C. inclusive and 80° C. inclusive, to prepare ceria precursors in the mixed water solution;

holding the mixed water solution for a period of time between 30 minutes inclusive and 48 hours inclusive to separate a ceria precursor powder as solid from liquid, washing the ceria precursor powder in water and then drying it, heat treating the ceria precursor powder within a temperature range between 150° C. inclusive and 300° C. inclusive for a period of time between 1 hour inclusive and 20 hours inclusive, and calcining the heat-treated powder at a temperature between 400° C. inclusive and 900° C. inclusive in circulation of oxygen to prepare a crystalline ceria nano-powder; and mixing the obtained ceria powder with platinum and an electroconductive carbon fine powder, to lower an onset potential (i.e., electric potential where oxidation reaction of CO is initiated) in an anode reaction.

Effect of the Invention

The present invention has succeeded in remarkably improving characteristics of an anode electrode utilizable in a fuel cell and the like, by using the material obtained by the above specific process as a catalytic active material for an electrode, and the material is expected to be used in fuel cells, various sensors, and the like from now on, thereby extensively contributing to improvement of performances thereof and to long-term stability of such improved performances. Particularly, the material of the present invention is expected to remarkably contribute to downsizing and increased outputs of recently noticed polymer fuel cells, with an extremely significant and important meaning.

BEST MODE FOR CARRYING OUT THE INVENTION

Here, the sintered body of the present invention is represented by a general formula: X*Pt/Y*$CeO_2$/Z*CARBON (where X, Y, and Z are content ratios by weight of platinum Pt, $CeO_2$, and CARBON; $0.1 \leq x \leq 0.4$, $0.1 \leq y \leq 0.4$, and Z=1−X−Y; and CARBON represents electroconductive carbon), and preferably is an electrode active material.

X's lower than the above described range lead to excessively lower amounts of Pt acting as a main component for exhibiting activity such that sufficient hydrogen generation from a fuel (alcohols such as methanol and ethanol) is not attained, thereby resultingly and disadvantageously failing to improve a power generation property of a fuel cell.

Further, X's higher than the above described range only allow for expectation of commensurate effects while leading to usage of a large amount of expensive Pt, thereby disadvantageously and excessively increasing a cost of an electrode itself.

Meanwhile, $CeO_2$ in the general formula is considered to serve to oxidize CO adsorbed onto a platinum surface. By hydrogen which is generated from a fuel at the Pt surface, there is lowered a partial pressure of oxygen near a $CeO_2$ surface (partial pressure of hydrogen is increased), so that numerous oxygen defects are formed at the $CeO_2$ surface, and simultaneously therewith, numerous active oxygen radicals are generated.

The active oxygen radicals are considered to immediately convert CO adsorbed on the platinum surface into $CO_2$, thereby removing an influence of CO poisoning at the Pt surface. However, Y's lower than the above described range lead to insufficient $CeO_2$ and thus an insufficient effect of CO poisoning mitigation, thereby disadvantageously deteriorating activity and stability of an electrode.

The function of such an anode electrode catalyst containing $CeO_2$ can also be confirmed in an electrochemical manner. Namely, such an electrode catalyst function can be confirmed by plotting a timewise change of an electric-current density while adopting, as a constant electric potential, a peak electric potential measured in cyclic voltammetry to be utilized in evaluating an electrode property.

Figure 1:
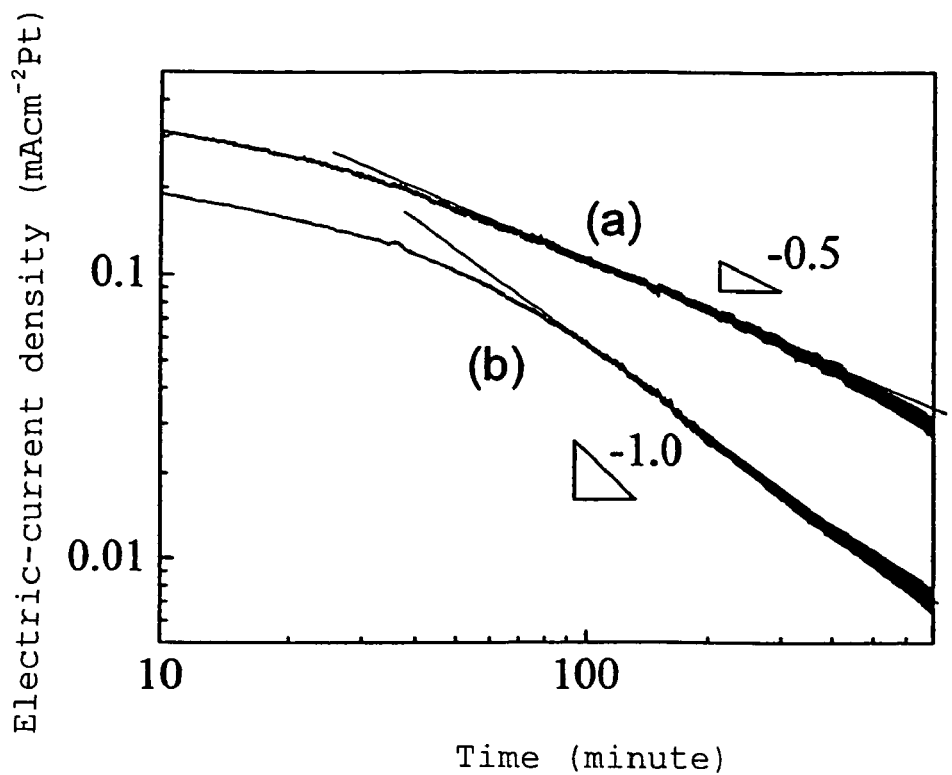
FIG. 1 is a graph of timewise change of electric-current values at a constant electric potential in a non-stirred state of a Pt/$CeO_2$/electroconductive carbon type nano-hetero anode material of the present invention, and a commercially available Pt/Ru/electroconductive carbon type nano-hetero anode material.

FIG. 1 shows a timewise change of electric-currents of a commercially available Pt/Ru/electroconductive carbon anode material (produced by ISHIFUKU Metal Industry Co., Ltd.) and a Pt/$CeO_2$/electroconductive carbon anode material synthesized by the present invention. As seen from this graph, the Pt/$CeO_2$/electroconductive carbon anode material synthesized by the present invention exhibited a change having a gradient of about 0.5, while the commercially available Pt/Ru/electroconductive carbon anode was rate-controlled by reaction and thus exhibited a change having a gradient of about 1.

This suggests that the reaction of the anode electrode synthesized according to the present invention has a rate controlled by oxygen diffusion. In each electrode, methanol is oxidized on Pt, and CO as a reaction intermediate adsorbs onto Pt. The Pt/Ru/electroconductive carbon anode material exhibits such an electrode reaction mechanism that a hydroxide radical (OH radical) having a higher activity for oxidation is generated on the Ru surface, and thereafter the OH radical removes CO adsorbed on the platinum into a form of $CO_2$. Contrary, in case of the Pt/$CeO_2$/electroconductive carbon anode material, CO adsorbed on the platinum is oxidized and removed by a catalytic action based on desorption and adsorption of an oxygen species generated from $CeO_2$, so that the reaction rate is controlled by diffusion of such an oxygen species.

In this way, the anode material obtainable by the present invention can be regarded to have a significant feature to exhibit an electrode reaction fully different from that of the conventional Pt/Ru/electroconductive carbon anode material.

Meanwhile, Y's higher than the above described range lead to excessive amounts of $CeO_2$ on an electroconductive carbon such that $CeO_2$ tend to mutually aggregate to form larger aggregations, which disadvantageously deteriorates an activity of the electrode and an effect of CO poisoning mitigation.

In turn, the value of Z is determined by the balance between the X and Y values, and is thus uniquely determined when the X and Y are set within appropriate ranges, respectively.

$CeO_2$ particles included in the general formula constitute an undoped $CeO_2$ powder without dissolving therein other components such as rare earth element and alkaline earth element, and the powder preferably has primary particle diameters between 10 nanometers inclusive and 50 nanometers inclusive. Adopting $CeO_2$ having large primary particle diameters exceeding this range as an electrode active material component, decreases an amount of Pt to be carried on $CeO_2$ and simultaneously deteriorates an interaction between Pt and $CeO_2$, thereby disadvantageously deteriorating an electrode activity and failing to mitigate CO poisoning.

Note that the interaction between Pt and $CeO_2$ refers to such a series of chemical reactions that: hydrogen generated on the Pt surface by conversion from a fuel forms oxygen defects on the $CeO_2$ surface to thereby generate active oxygen radicals, and the active oxygen radicals oxidize CO adsorbed on the Pt surface.

Meanwhile, the primary particle diameters of $CeO_2$ have a possible lower limit such that a process for preparing $CeO_2$ having extremely small primary particle diameters leads to a drastically increased production cost of an electrode as a whole, thereby justifying adoption of $CeO_2$ nanoparticles having primary particle diameters of 10 nanometers or more from an industrial standpoint.

Further, secondary particle diameters of $CeO_2$ are preferably between 60 nanometers inclusive and 300 nanometer inclusive. Exceeding this range decreases an amount of Pt to be carried on $CeO_2$ and simultaneously deteriorates an interaction between Pt and $CeO_2$, thereby disadvantageously deteriorating an electrode activity and failing to mitigate CO poisoning.

Meanwhile, the secondary particle diameters of $CeO_2$ have a possible lower limit such that preparation of $CeO_2$ having extremely small secondary particle diameters, i.e., adoption of a process for preparing a $CeO_2$ powder in a monodispersion state, leads to a drastically increased production cost of an electrode as a whole, thereby justifying adoption of $CeO_2$ nanoparticles having secondary particle diameters of 60 nanometers or more from an industrial standpoint.

Concerning shapes, $CeO_2$ nanoparticles preferably include 50% or more of spherical particles in terms of a numerical percentage based on spherical and columnar particles. In a state where the numerical percentage is low so that columnar particles take the majority, the amount of Pt to be carried on $CeO_2$ is decreased and the interaction between Pt and $CeO_2$ is simultaneously deteriorated, thereby disadvantageously deteriorating an electrode activity and failing to mitigate CO poisoning. It is thus more preferable that all $CeO_2$ particles are spherical, and increase of presence ratio of spherical particles importantly leads to improvement of electrode activity.

Among $CeO_2$ particles, aspect ratios of columnar particles are preferably 20 or less. Columnar $CeO_2$ particles having aspect ratios larger than the above value fail to carry thereon sufficient Pt in a uniform manner, and the interaction between Pt and $CeO_2$ is simultaneously deteriorated, thereby disadvantageously deteriorating an electrode activity and failing to mitigate CO poisoning.

Further, breadths of columnar $CeO_2$ particles in minor axis directions are preferably 300 nanometers or less. Breadths exceeding the above value cause columnar $CeO_2$ particles to fail to carry thereon sufficient Pt in a uniform manner, and the interaction between Pt and $CeO_2$ is simultaneously deteriorated, thereby disadvantageously deteriorating an electrode activity and failing to mitigate CO poisoning.

Additionally, platinum particles present on $CeO_2$ particles or extremely near them preferably have primary particle diameters of 50 nanometers or less. On surfaces of larger Pt particles having sizes exceeding the above value, the rate of reaction for preparing hydrogen from a fuel is decreased, thereby disadvantageously and considerably deteriorating an electrode activity.

Similarly, secondary particle diameters of Pt are preferably 300 nanometers or less. Adoption of Pt particles strongly aggregated to have diameters exceeding the above range decreases the rate of reaction for preparing hydrogen from a fuel, thereby disadvantageously and considerably deteriorating an electrode activity.

Further, while it is necessary to blend materials in a manner to attain the composition formula X*Pt/Y*$CeO_2$/Z*CARBON (where $0.1 \leq x \leq 0.4$, $0.1 \leq y \leq 0.4$, and $Z=1-X-Y$; and CARBON represents electroconductive carbon) so as to prepare the Pt/$CeO_2$/electroconductive carbon nano-hetero anode material in the present invention, extreme importance is given to: synthetic methods for nanoparticles of respective components before blending; and blending manners.

Firstly, it is necessary to prepare a cerium nitrate water solution (having a concentration between 0.5M inclusive and 3M inclusive) so as to prepare $CeO_2$ particles in nano-sizes. The concentration of the water solution of the material is an important factor largely affecting shapes (spherical or columnar) of $CeO_2$ particles to be synthesized. Concentrations lower than the range specified by the present invention generate plate-like particles in addition to columnar particles, thereby disadvantageously decreasing the number of spherical particles required for preparing an electrode exhibiting a higher activity. Concentrations higher than the above range mainly generate columnar particles, thereby disadvantageously decreasing the number of spherical particles.

Next, the water solution is required to be dropped into an ammonium carbonate or ammonium hydrogencarbonate water solution (having a concentration between 0.5M inclusive and 9M inclusive, in either case) heated to a temperature between 50° C. inclusive and 80° C. inclusive, to prepare ceria precursors. At this time, the temperature of the ammonium carbonate or ammonium hydrogencarbonate water solution acting as a precipitator has to be controlled to be between 50° C. inclusive and 80° C. inclusive.

Temperatures lower than the above range increase secondary particle diameters of $CeO_2$ particles to be generated (i.e., aggregation is enhanced), thereby disadvantageously deteriorating an electrode activity. Temperatures higher than the above range lead to initiation of decomposition of ammonium carbonate or ammonium hydrogencarbonate, to thereby not only decrease the concentration thereof but also increase secondary particle diameters of $CeO_2$ particles to be generated (i.e., aggregation is enhanced), thereby disadvantageously deteriorating an electrode activity.

The concentration of ammonium carbonate or ammonium hydrogencarbonate water solution is preferably between 0.5M inclusive and 9M inclusive. Concentrations lower than the above range generate numerous needle-like $CeO_2$ particles which are small in particle size but large in aspect ratio, thereby resultingly and disadvantageously deteriorating an electrode activity. Concentrations higher than the above range generate numerous columnar $CeO_2$ particles which are small in aspect ratio but extremely large (thick) in minor axis of the columnar particles, thereby also resultingly and disadvantageously deteriorating an electrode activity.

Although there is not particularly imposed a limitation on a rate for dropping the cerium nitrate water solution into the ammonium carbonate or ammonium hydrogencarbonate water solution heated to the temperature between 50° C. inclusive and 80° C. inclusive, it is desirable to conduct dropping at a rate slower than 2 milliliter/minute since dropping at excessively faster rates causes aggregation of precipitation.

Further, in order to prepare spherical particles in nanosizes, it is desirable to subject the precipitation prepared by the above operation to continuous stirring for 30 minutes or longer (achievement of maturation treatment) at a temperature between 50° C. inclusive and 80° C. inclusive in the ammonium carbonate or ammonium hydrogencarbonate water solution heated to the temperature between 50° C. inclusive and 80° C. inclusive, even after completion of the dropping of the cerium nitrate water solution thereinto. Excessively shorter periods of time for maturation enhance aggregation of the powder, thereby disadvantageously leading to deterioration of electrode activity. Contrary, excessively longer periods of time for maturation rather lead to occurrence of aggregation of precipitation, so that the maturation treatment is preferably conducted for a period of time in a range between 30 minutes inclusive and 48 hours inclusive.

The thus obtained precursors are required to be subjected to filtration and water washing several times in a repeated manner, and to sufficient drying in circulation of inert gas, followed by calcination in circulation of oxygen at a temperature between 400° C. inclusive and 900° C. inclusive. Failure of circulation of oxygen upon calcination leads to a large amount of combustible impurities in the product, and the impurities disadvantageously and considerably deteriorate an electrode activity.

Further, calcination temperatures are preferably between 400° C. inclusive and 900° C. inclusive. Temperatures lower than the aforementioned range lead to insufficient crystallization of $CeO_2$ such that $CeO_2$ are brought to have crystal structures other than a fluorite crystal structure. In this case, there is not sufficiently conducted the expected interaction between Pt and $CeO_2$, thereby disadvantageously leading to insufficient exhibition of an electrode activity, an effect of CO poisoning mitigation on a Pt surface, and the like. Contrary, temperatures higher than the aforementioned range cause $CeO_2$ particles to associate with one another to form larger secondary particles, thereby resultingly and disadvantageously deteriorating an electrode activity.

The thus obtained ceria nano-powder is required to be subsequently mixed with a chloroplatinic acid ($H_2PtCl_6 \cdot 6H_2O$) water solution (having a concentration between 0.05 mole/liter (M) inclusive and 1.0 mole/liter (M) inclusive) and an electroconductive carbon fine powder, and the mixture is dried by evaporating the solvent in the mixture in circulation of inert gas. Concentrations of chloroplatinic acid higher than the above-described range disadvantageously lead to occurrence of aggregation of Pt particles to cause deterioration of an electrode activity, and concentrations of chloroplatinic acid lower than the above-described range lead to insufficient Pt particles carried on $CeO_2$ nanoparticles, thereby disadvantageously deteriorating an electrode activity and an effect of Co poisoning mitigation.

Although it is possible to adopt water or distilled water as the solvent upon mixing, it is more desirable to adopt an organic solvent such as ethanol so as to obtain a uniformly mixed state. Further, the mixedly obtained electrode active material is required to be subjected to slow evaporation of the solvent thereof, in circulation of inert gas. When removal of the solvent is exemplarily conducted by a heat treatment without using inert gas, particles narrowly dispersed in nanosizes are caused to associate with one another to form large-sized aggregations, thereby resultingly, disadvantageously and considerably deteriorating an electrode activity.

The thus obtained electrode component is to be calcined at a temperature between 300° C. inclusive and 500° C. inclusive in circulation of hydrogen. The heat treatment conducted in circulation of hydrogen reduces an oxide film at a Pt surface to thereby sufficiently exhibit an activity of the Pt surface, and the calcination temperature is preferably between 300° C. inclusive and 500° C. inclusive. Temperatures lower than the above-described range lead to insufficient expression of an effect of hydrogen for removing an oxide film at a Pt surface to thereby disadvantageously fail to improve an electrode activity, and temperatures higher than the above-described range rather cause Pt particles to associate with one another to form larger Pt particle aggregations, thereby disadvantageously and considerably deteriorating an activity of the resultingly obtained electrode.

The electrode performance is not defined by an electric-current value of the electrode only, and it is also important that an onset potential, at which an oxidation reaction of CO is initiated, is low. Lower values of such a potential mean that oxidation of CO adsorbed on Pt is easily caused.

Further, adopting an anode having a lower onset potential as a fuel cell-oriented electrode enables to decrease an anode loss to be caused upon power generation of the fuel cell, and to take larger electric-current density and output out of the fuel cell.

Thus, onset potentials are to be sufficiently low.

Upon synthesizing $CeO_2$ particles to be included in a Pt/$CeO_2$/electroconductive carbon anode material, it is an effective method for lowering the onset potential, to: previously heat-treat $CeO_2$ precursors at a temperature in a range between 150° C. inclusive and 300° C. inclusive for a period of time between 1 hour inclusive and 20 hours; calcine the precursors at a temperature between 400° C. inclusive and 900° C. inclusive in circulation of oxygen, thereby preparing $CeO_2$ nanoparticles having higher crystallinity; and adopt the $CeO_2$ powder as an electrode performance.

$CeO_2$ precursors obtained by a coprecipitation method are considered to form nuclei of ceria at a temperature in a range between 150° C. inclusive and 300° C. inclusive. Thus, heat treatments conducted at temperatures lower than the above-described temperature range fail to sufficiently enhance the crystallinity of $CeO_2$, thereby resultingly and disadvantageously failing to cause an oxidation reaction of CO at a lower electric potential. In turn, heat treatments conducted at temperatures higher than the above-described temperature range only allows for commensurate effects and fail to lower onset potentials, thereby making it enough to adopt an upper limit of 300° C.

Further, the heat treatment requires a period of time longer than 1 hour, and heat treatments conducted for periods of time extremely shorter than the above-described period of time fail to enhance crystallinity of $CeO_2$, thereby resultingly and disadvantageously failing to cause an oxidation reaction of CO at a lower electric potential. In turn, heat treatments conducted for periods of time longer than 20 hours only allows for commensurate effects and fail to lower onset potentials, thereby making it enough to conduct a heat treatment for about 20 hours.

EXAMPLE

The present invention will be now described based on Examples, accompanying drawings, and Comparative Examples. Note that these Examples are merely disclosed to concretely show the present invention and to aid in readily understanding the present invention, and the aspects of the present invention are not limited to the Examples.

Example 1

To attain a composition of 30 wt % Pt/26 wt % $CeO_2$/44 wt % C, 1.0 mole/liter of cerium nitrate (purity 99.99%) and 2.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 800° C. for 2 hours in circulation of oxygen (250 milliliter/minute) to prepare a crystalline ceria powder, which was confirmed to comprise a single crystal phase of fluorite by an X-ray diffraction test.

Figure 2:
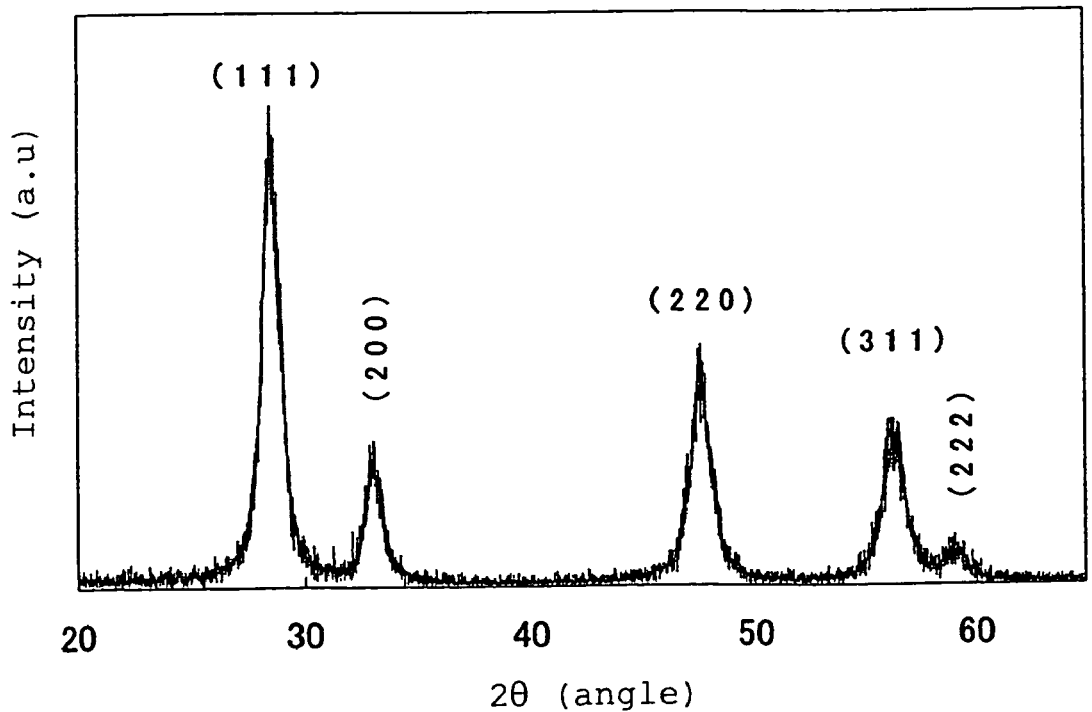
FIG. 2 is an X-ray diffraction diagram of a ceria powder synthesized by a production method of the present invention.

FIG. 2 shows an identification result for the crystal phase by the X-ray diffraction test. The calcinedly obtained powder included, in a coexistent manner, spherical particles having an averaged primary particle diameter of 50 nanometers and an averaged secondary particle diameter of 200 nanometers, and columnar particles having an averaged aspect ratio of 15 and breadths of 250 nanometers or shorter in minor axis directions. The numerical percentage of spherical $CeO_2$ particles based on spherical and columnar $CeO_2$ particles was about 90%.

Figure 3:
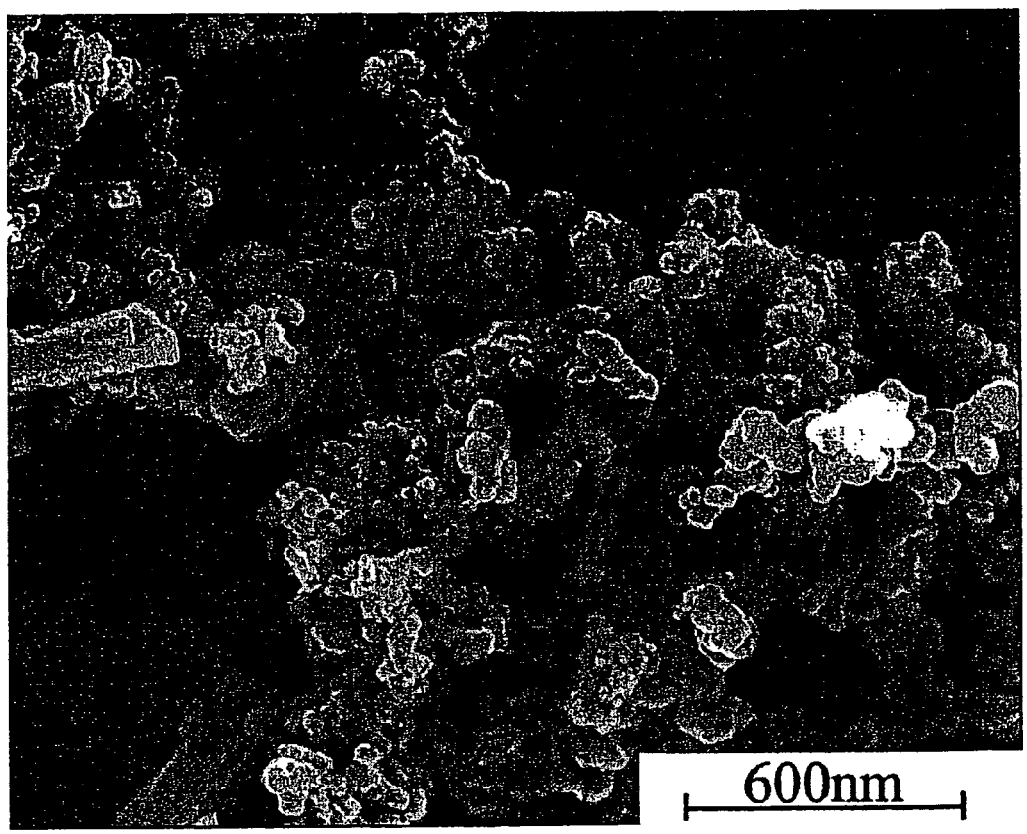
FIG. 3 is a SEM photograph of the ceria powder synthesized by the production method of the present invention.

FIG. 3 shows a scanning electron microscope (SEM) observation photograph of the above obtained electrode substance.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

Figure 4:
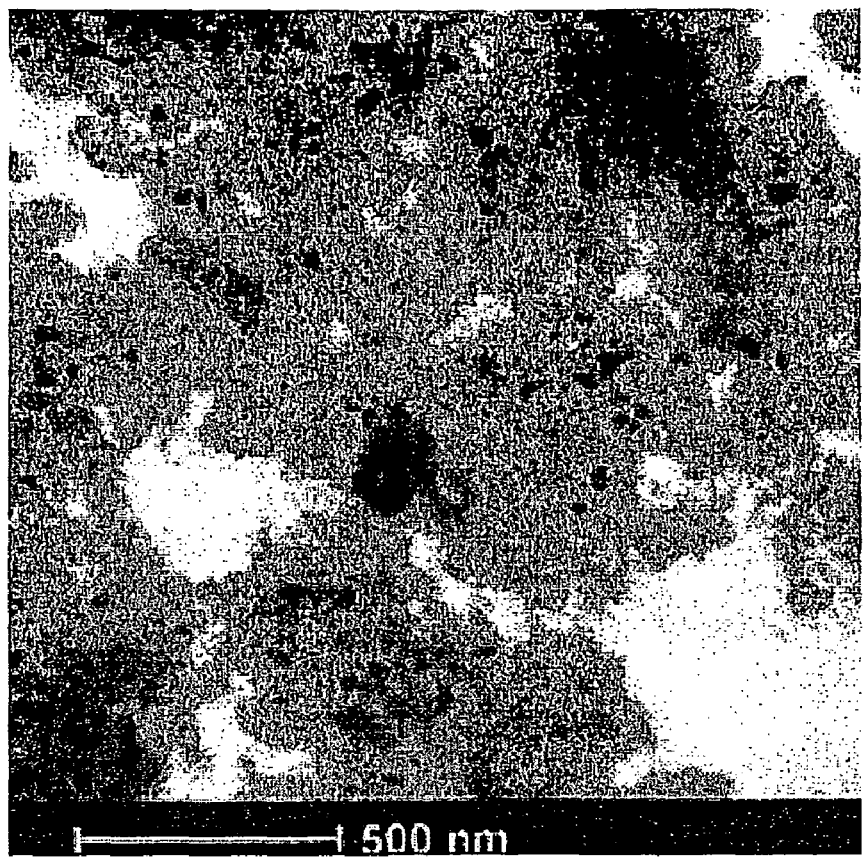
FIG. 4 is a TEM photograph of a Pt/$CeO_2$/electroconductive carbon type nano-hetero anode material synthesized by the production method of the present invention.

Since Pt particles in the prepared electrode active material were extremely small and not observable by a SEM, FIG. 4 is a photograph showing an observation result of forms of Pt particles on ceria by a transmission electron microscope (TEM). As seen from the photograph, it was found that Pt particles were brought into nanoparticles having primary particle diameters of 40 nanometers or less and secondary particle diameters of about 200 nanometers.

The thus obtained electrode active material was subjected to an electrode activity evaluation, by conducting cyclic voltammetry at a scanning speed of 50 mV/s for the electrode active material placed in a mixed water solution including an $H_2SO_4$ water solution having a concentration of 0.5 mole/liter and a methanol water solution having a concentration of 0.5 mole/liter.

Figure 5:
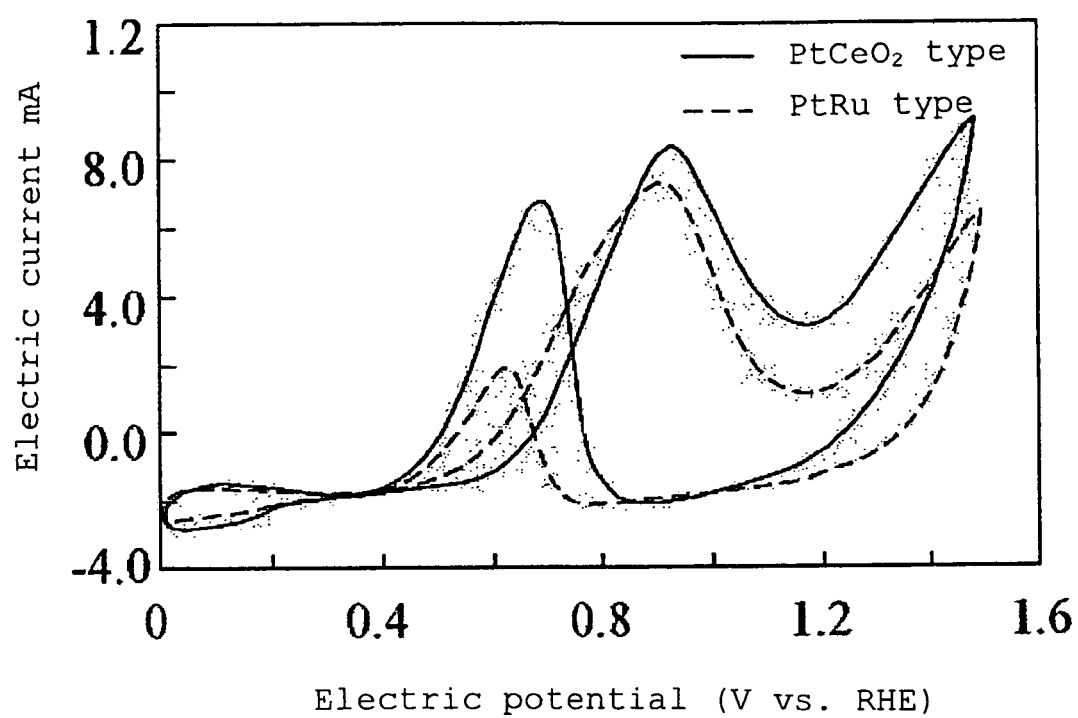
FIG. 5 is a comparative cyclic voltammogram of anode material, showing an electrode property of Example 1 represented by a solid line, and an electrode property of Comparative Example 17 represented by a broken line (electrolytic solution: 0.5M sulfuric acid water solution+0.5M methanol; and scanning speed: 50 mV/sec).

FIG. 5 shows a cyclic voltammogram of the electrode active material obtained by this Example. As seen from this diagram, there was confirmed a peak of a larger electric-current value of 7.8 mA exhibiting methanol oxidation at an electric potential of 0.70V vs. RHE. The magnitude of the peak represents an index for evaluating an efficiency of conversion from: CO generated as by-product upon generation of hydrogen from methanol; into $CO_2$; in a manner that larger values of attained electric-current imply easier progress of conversion reaction from CO into $CO_2$; thereby confirming that the anode material obtained in Example 1 caused conversion of methanol into hydrogen and CO, and easy progress of the CO as by-product into $CO_2$, to exhibit an extremely higher electrode activity. Also, the onset potential, as an index representing readiness of occurrence of an oxidation reaction of CO, was as sufficiently low as 0.48 (V vs. RHE).

The resultant data obtained in Example 1 are collectively shown in Table 1 through Table 6.

Example 2

To attain a composition of 15 wt % Pt/35 wt % $CeO_2$/50 wt % C, 1.0 mole/liter of cerium nitrate (purity 99.99%) and 2.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 800° C. for 2 hours in circulation of oxygen (250 milliliter/minute) to prepare a crystalline ceria powder, which was confirmed to comprise a single crystal phase of fluorite similarly to Example 1 by an X-ray diffraction test. From a SEM observation result of the prepared electrode substance, the calcinedly obtained powder included, in a coexistent manner, spherical particles having an averaged primary particle diameter of 40 nanometers and an averaged secondary particle diameter of 150 nanometers, and columnar particles having an averaged aspect ratio of 17 and breadths of 150 nanometers or shorter in minor axis directions. The numerical percentage of spherical $CeO_2$ particles based on spherical and columnar $CeO_2$ particles was about 90%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

From a TEM observation result, it was found that Pt particles on ceria in the prepared electrode active material were brought into nanoparticles having primary particle diameters of 45 nanometers and secondary particle diameters of about 180 nanometers.

The thus obtained electrode active material was subjected to an electrode activity evaluation, by conducting cyclic voltammetry under the same experiment conditions as Example 1.

As a result, there was confirmed a peak of a larger electric-current value of 7.6 mA exhibiting methanol oxidation at an electric potential of 0.70V vs. RHE, thereby confirming that the anode material obtained in Example 2 caused conversion of methanol into hydrogen and CO, and easy progress of the CO as by-product into $CO_2$, to exhibit an extremely higher electrode activity. Also, the onset potential, as an index representing readiness of occurrence of an oxidation reaction of CO, was as sufficiently low as 0.49 (V vs. RHE).

The resultant data obtained in Example 2 are collectively shown in Table 1 through Table 6, similarly to Example 1.

Example 3

To attain a composition of 30 wt % Pt/26 wt % $CeO_2$/44 wt % C, 2.5 mole/liter of cerium nitrate (purity 99.99%) and 7.5 mole/liter of ammonium hydrogencarbonate water solution (purity 99.5%) were prepared as starting materials, respectively, and the cerium nitrate water solution was dropped into the ammonium hydrogencarbonate water solution heated to 70° C. at a rate of 1 milliliter/minute, to prepare a precipitation. After completion of dropping of the cerium nitrate water solution, maturation was conducted at a temperature of 70° C. for 10 hours.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 500° C. for 6 hours in circulation of oxygen (250 milliliter/minute) to prepare a crystalline ceria powder, which was confirmed to comprise a single crystal phase of fluorite similarly to Example 1 by an X-ray diffraction test. From a SEM observation result of the prepared electrode substance, the calcinedly obtained powder included, in a coexistent manner, spherical particles having an averaged primary particle diameter of 40 nanometers and an averaged secondary particle diameter of 120 nanometers, and columnar particles having an averaged aspect ratio of 18 and breadths of 240 nanometers or shorter in minor axis directions. The numerical percentage of spherical $CeO_2$ particles based on spherical and columnar $CeO_2$ particles was about 80%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 450° C. for 2 hours within a tubular furnace in circulation of high purity hydrogen (250 milliliter/minute), thereby conducting an activation treatment of a Pt surface.

From a TEM observation result, it was found that Pt particles on ceria in the prepared electrode active material were brought into nanoparticles having primary particle diameters of 41 nanometers and secondary particle diameters of about 190 nanometers.

The thus obtained electrode active material was subjected to an electrode activity evaluation, by conducting cyclic voltammetry under the same experiment conditions as Example 1.

As a result, there was confirmed a peak of a larger electric-current value of 7.7 mA exhibiting methanol oxidation at an electric potential of 0.70V vs. RHE, thereby confirming that the anode material obtained in Example 3 caused conversion of methanol into hydrogen and CO, and easy progress of the CO as by-product into $CO_2$, to exhibit an extremely higher electrode activity. Also, the onset potential, as an index representing readiness of occurrence of an oxidation reaction of CO, was as sufficiently low as 0.48 (V vs. RHE).

The resultant data obtained in Example 3 are collectively shown in Table 1 through Table 6, similarly to Example 1.

Example 4

To attain a composition of 35 wt % Pt/15 wt % $CeO_2$/50 wt % C, 2.5 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium hydrogencarbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 700° C. for 2 hours in circulation of oxygen (250 milliliter/minute) to prepare a crystalline ceria powder, which was confirmed to comprise a single crystal phase of fluorite similarly to Example 1 by an X-ray diffraction test. From a SEM observation result of the prepared electrode substance, the calcinedly obtained powder included, in a coexistent manner, spherical particles having an averaged primary particle diameter of 45 nanometers and an averaged secondary particle diameter of 180 nanometers, and columnar particles having an averaged aspect ratio of 20 and breadths of 245 nanometers or shorter in minor axis directions. The numerical percentage of spherical $CeO_2$ particles based on spherical and columnar $CeO_2$ particles was about 85%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 350° C. for 2 hours within a tubular furnace in circulation of high purity hydrogen (250 milliliter/minute), thereby conducting an activation treatment of a Pt surface.

From a TEM observation result, it was found that Pt particles on ceria in the prepared electrode active material were brought into nanoparticles having primary particle diameters of 40 nanometers and secondary particle diameters of about 150 nanometers.

The thus obtained electrode active material was subjected to an electrode activity evaluation, by conducting cyclic voltammetry under the same experiment conditions as Example 1.

As a result, there was confirmed a peak of a larger electric-current value of 7.2 mA exhibiting methanol oxidation at an electric potential of 0.70V vs. RHE, thereby confirming that the anode material obtained in Example 4 caused conversion of methanol into hydrogen and CO, and easy progress of the CO as by-product into $CO_2$, to exhibit an extremely higher electrode activity. Also, the onset potential, as an index representing readiness of occurrence of an oxidation reaction of CO, was as sufficiently low as 0.48 (V vs. RHE).

The resultant data obtained in Example 4 are collectively shown in Table 1 through Table 6, similarly to Example 1.

Example 5

To attain a composition of 30 wt % Pt/26 wt % $CeO_2$/44 wt % C, 2.5 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium carbonate water solution heated to 70° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 800° C. for 2 hours in circulation of oxygen (250 milliliter/minute) to prepare a crystalline ceria powder, which was confirmed to comprise a single crystal phase of fluorite similarly to Example 1 by an X-ray diffraction test. From a SEM observation result of the prepared electrode substance, the calcinedly obtained powder included, in a coexistent manner, spherical particles having an averaged primary particle diameter of 40 nanometers and an averaged secondary particle diameter of 120 nanometers, and columnar particles having an averaged aspect ratio of 18 and breadths of 240 nanometers or shorter in minor axis directions. The numerical percentage of spherical $CeO_2$ particles based on spherical and columnar $CeO_2$ particles was about 80%.

Next, the ceria nano-powder prepared in this Example was weighed to meet the above composition formula and dispersed into a mixed solution of: 0.90 mole/liter of prepared chloroplatinic acid water solution; and a solution obtained by dispersing prepared carbon black into distilled water; to thereby substantially disperse applicable three kinds of electrode active materials in the resultant mixed solution; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 450° C. for 2 hours within a tubular furnace in circulation of high purity hydrogen (250 milliliter/minute), thereby conducting an activation treatment of a Pt surface.

From a TEM observation result, it was found that Pt particles on ceria in the prepared electrode active material were brought into nanoparticles having primary particle diameters of 40 nanometers and secondary particle diameters of about 200 nanometers.

The thus obtained electrode active material was subjected to an electrode activity evaluation, by conducting cyclic voltammetry under the same experiment conditions as Example 1.

As a result, there was confirmed a peak of a larger electric-current value of 7.7 mA exhibiting methanol oxidation at an electric potential of 0.70V vs. RHE, thereby confirming that the anode material obtained in Example 5 caused conversion of methanol into hydrogen and CO, and easy progress of the CO as by-product into $CO_2$, to exhibit an extremely higher electrode activity. Also, the onset potential, as an index representing readiness of occurrence of an oxidation reaction of CO, was as sufficiently low as 0.49 (V vs. RHE).

The resultant data obtained in Example 5 are collectively shown in Table 1 through Table 6, similarly to Example 1.

Example 6

To attain a composition of 30 wt % Pt/26 wt % $CeO_2$/44 wt % C, 2.5 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium carbonate water solution heated to 70° C. at a rate of 1 milliliter/minute, to prepare a precipitation. After completion of dropping of the cerium nitrate water solution, maturation was conducted at a temperature of 70° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 500° C. for 6 hours in circulation of oxygen (250 milliliter/minute) to prepare a crystalline ceria powder, which was confirmed to comprise a single crystal phase of fluorite similarly to Example 1 by an X-ray diffraction test. From a SEM observation result of the prepared electrode substance, the calcinedly obtained powder included, in a coexistent manner, spherical particles having an averaged primary particle diameter of 40 nanometers and an averaged secondary particle diameter of 120 nanometers, and columnar particles having an averaged aspect ratio of 18 and breadths of 240 nanometers or shorter in minor axis directions. The numerical percentage of spherical $CeO_2$ particles based on spherical and columnar $CeO_2$ particles was about 80%.

Next, the ceria nano-powder prepared in this Example was weighed to meet the above composition formula and dispersed into a mixed solution of: 0.10 mole/liter of prepared chloroplatinic acid water solution; and a solution obtained by dispersing prepared carbon black into distilled water; to thereby substantially disperse applicable three kinds of electrode active materials in the resultant mixed solution; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute. The obtained electrode active material was calcined at 450° C. for 2 hours within a tubular furnace in circulation of high purity hydrogen (250 milliliter/minute), thereby conducting an activation treatment of a Pt surface.

From a TEM observation result, it was found that Pt particles on ceria in the prepared electrode active material were brought into nanoparticles having primary particle diameters of 40 nanometers or less and secondary particle diameters of about 190 nanometers. The thus obtained electrode active material was subjected to an electrode activity evaluation, by conducting cyclic voltammetry under the same experiment conditions as Example 1.

As a result, there was confirmed a peak of a larger electric-current value of 7.7 mA exhibiting methanol oxidation at an electric potential of 0.70V vs. RHE, thereby confirming that the anode material obtained in Example 6 caused conversion of methanol into hydrogen and CO, and easy progress of the CO as by-product into $CO_2$, to exhibit an extremely higher electrode activity. Also, the onset potential, as an index representing readiness of occurrence of an oxidation reaction of CO, was as sufficiently low as 0.49 (V vs. RHE).

The resultant data obtained in Example 6 are collectively shown in Table 1 through Table 6, similarly to Example 1.

Example 7

To attain a composition of 30 wt % Pt/26 wt % $CeO_2$/44 wt % C, 1.0 mole/liter of cerium nitrate (purity 99.99%) and 2.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently subjected to a heat treatment at a temperature of 150° C. for 2 hours, then heated to 800° C. without temperature fall, and calcined for 2 hours, in circulation of oxygen (250 milliliter/minute), to prepare a crystalline ceria powder, which was confirmed to comprise a single crystal phase of fluorite similarly to Example 1 by an X-ray diffraction test. The calcinedly obtained powder included, in a coexistent manner, spherical particles having an averaged primary particle diameter of 50 nanometers and an averaged secondary particle diameter of 150 nanometers, and columnar particles having an averaged aspect ratio of 12 and breadths of 200 nanometers or shorter in minor axis directions. The numerical percentage of spherical $CeO_2$ particles based on spherical and columnar $CeO_2$ particles was about 93%.

The $CeO_2$ nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

It was found that Pt particles in the prepared electrode active material were brought into nanoparticles having primary particle diameters of 40 nanometers or less and secondary particle diameters of about 200 nanometers.

The thus obtained electrode active material was subjected to an electrode activity evaluation, by conducting cyclic voltammetry under the same experiment conditions as Example 1.

As a result, there was confirmed a peak of a larger electric-current value of 8.5 mA exhibiting methanol oxidation at an electric potential of 0.70V vs. RHE. The magnitude of the peak represents an index for evaluating an efficiency of conversion from: CO generated as by-product upon generation of hydrogen from methanol; into $CO_2$; in a manner that larger values of attained electric-current imply easier progress of conversion reaction from CO into $CO_2$; thereby confirming that the anode material obtained in Example 7 caused conversion of methanol into hydrogen and CO, and easy progress of the CO as by-product into $CO_2$, to exhibit an extremely higher electrode activity. Also, the onset potential, as an index representing readiness of occurrence of an oxidation reaction of CO, was as sufficiently low as 0.44 (V vs. RHE).

Example 8

To attain a composition of 30 wt % Pt/26 wt % $CeO_2$/44 wt % C, 1.0 mole/liter of cerium nitrate (purity 99.99%) and 2.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently subjected to a heat treatment at a temperature of 150° C. for 15 hours, then heated to 800° C. without temperature fall, and calcined for 2 hours, in circulation of oxygen (250 milliliter/minute), to prepare a crystalline ceria powder, which was confirmed to comprise a single crystal phase of fluorite similarly to Example 1 by an X-ray diffraction test. The calcinedly obtained powder included, in a coexistent manner, spherical particles having an averaged primary particle diameter of 50 nanometers and an averaged secondary particle diameter of 130 nanometers, and columnar particles having an averaged aspect ratio of 12 and breadths of 200 nanometers or shorter in minor axis directions. The numerical percentage of spherical $CeO_2$ particles based on spherical and columnar $CeO_2$ particles was about 94%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

It was found that Pt particles in the prepared electrode active material were brought into nanoparticles having primary particle diameters of 40 nanometers or less and secondary particle diameters of about 200 nanometers. The thus obtained electrode active material was subjected to an electrode activity evaluation, by conducting cyclic voltammetry under the same experiment conditions as Example 1.

As a result, there was confirmed a peak of a larger electric-current value of 8.6 mA exhibiting methanol oxidation at an electric potential of 0.70V vs. RHE. The magnitude of the peak represents an index for evaluating an efficiency of conversion from: CO generated as by-product upon generation of hydrogen from methanol; into $CO_2$; in a manner that larger values of attained electric-current imply easier progress of conversion reaction from CO into $CO_2$; thereby confirming that the anode material obtained in Example 8 caused conversion of methanol into hydrogen and CO, and easy progress of the CO as by-product into $CO_2$, to exhibit an extremely higher electrode activity. Also, the onset potential, as an index representing readiness of occurrence of an oxidation reaction of CO, was as sufficiently low as 0.43 (V vs. RHE).

Example 9

To attain a composition of 30 wt % Pt/26 wt % $CeO_2$/44 wt % C, 1.0 mole/liter of cerium nitrate (purity 99.99%) and 2.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently subjected to a heat treatment at a temperature of 280° C. for 15 hours, then heated to 800° C. without temperature fall, and calcined for 2 hours, in circulation of oxygen (250 milliliter/minute), to prepare a crystalline ceria powder, which was confirmed to comprise a single crystal phase of fluorite similarly to Example 1 by an X-ray diffraction test.

The calcinedly obtained powder included, in a coexistent manner, spherical particles having an averaged primary particle diameter of 50 nanometers and an averaged secondary particle diameter of 130 nanometers, and columnar particles having an averaged aspect ratio of 10 and breadths of 170 nanometers or shorter in minor axis directions. The numerical percentage of spherical $CeO_2$ particles based on spherical and columnar $CeO_2$ particles was about 95%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

It was found that Pt particles in the prepared electrode active material were brought into nanoparticles having primary particle diameters of 40 nanometers or less and secondary particle diameters of about 200 nanometers.

The thus obtained electrode active material was subjected to an electrode activity evaluation, by conducting cyclic voltammetry under the same experiment conditions as Example 1.

As a result, there was confirmed a peak of a larger electric-current value of 8.6 mA exhibiting methanol oxidation at an electric potential of 0.70V vs. RHE. The magnitude of the peak represents an index for evaluating an efficiency of conversion from: Co generated as by-product upon generation of hydrogen from methanol; into $CO_2$; in a manner that larger values of attained electric-current imply easier progress of conversion reaction from CO into $CO_2$; thereby confirming that the anode material obtained in Example 8 caused conversion of methanol into hydrogen and CO, and easy progress of the CO as by-product into $CO_2$, to exhibit an extremely higher electrode activity.

Also, the onset potential, as an index representing readiness of occurrence of an oxidation reaction of CO, was as sufficiently low as 0.44 (V vs. RHE).

TABLE 1

| Exam. | Electrode Composition | Concentration of cerium nitrate | Concentration of ammonium carbonate or ammonium hydrogencarbonate aqueous solution (M) |
| --- | --- | --- | --- |
| Ex. 1 | 30 wt % Pt/26 wt % $CeO_2$/44 wt % C | 1.0 | 2.5 |
| Ex. 2 | 15 wt % Pt/35 wt % $CeO_2$/50 wt % C | 1.0 | 2.5 |
| Ex. 3 | 30 wt % Pt/26 wt % $CeO_2$/44 wt % C | 2.5 | 7.5 |
| Ex. 4 | 35 wt % Pt/15 wt % $CeO_2$/50 wt % C | 2.5 | 7.5 |

TABLE 1-continued

| Exam. | Electrode Composition | Concentration of cerium nitrate | Concentration of ammonium carbonate or ammonium hydrogencarbonate aqueous solution (M) |
|---|---|---|---|
| Ex. 5 | 30 wt % Pt/26 wt % CeO$_2$/44 wt % C | 2.5 | 7.5 |
| Ex. 6 | 30 wt % Pt/26 wt % CeO$_2$/44 wt % C | 2.5 | 7.5 |
| Ex. 7 | 30 wt % Pt/26 wt % CeO$_2$/44 wt % C | 1.0 | 2.5 |
| Ex. 8 | 30 wt % Pt/26 wt % CeO$_2$/44 wt % C | 1.0 | 2.5 |
| Ex. 9 | 30 wt % Pt/26 wt % CeO$_2$/44 wt % C | 1.0 | 2.5 |

TABLE 2

| Exam. | Maturation temp. (° C.) | Maturation time (hour) | Heat treatment temp. (° C.) of ceria precursor | Heat treatment time (hour) of ceria precursor | Calcination temp. (° C.) of ceria precursor | Calcination time (hour) of ceria precursor |
|---|---|---|---|---|---|---|
| Ex. 1 | 75 | 1 | undone | 0 | 800 | 2 |
| Ex. 2 | 75 | 1 | undone | 0 | 800 | 2 |
| Ex. 3 | 70 | 10 | undone | 0 | 500 | 6 |
| Ex. 4 | 75 | 1 | undone | 0 | 700 | 2 |
| Ex. 5 | 75 | 1 | undone | 0 | 800 | 2 |
| Ex. 6 | 70 | 1 | undone | 0 | 500 | 6 |
| Ex. 7 | 75 | 1 | 150 | 2 | 800 | 2 |
| Ex. 8 | 75 | 1 | 150 | 15 | 800 | 2 |
| Ex. 9 | 75 | 1 | 280 | 15 | 800 | 2 |

TABLE 3

| Exam. | Crystal phase of ceria | Primary particle diameter (nm) of ceria | Secondary particle diameter (nm) of ceria | Percentage of spherical ceria particle (%) |
|---|---|---|---|---|
| Ex. 1 | Fluorite structure | 50 | 200 | 90 |
| Ex. 2 | Fluorite structure | 40 | 150 | 90 |
| Ex. 3 | Fluorite structure | 40 | 120 | 80 |
| Ex. 4 | Fluorite structure | 45 | 180 | 85 |
| Ex. 5 | Fluorite structure | 40 | 120 | 80 |
| Ex. 6 | Fluorite structure | 40 | 120 | 80 |
| Ex. 7 | Fluorite structure | 50 | 150 | 93 |
| Ex. 8 | Fluorite structure | 50 | 130 | 94 |
| Ex. 9 | Fluorite structure | 50 | 130 | 95 |

TABLE 4

| Exam. | Aspect ratio of columnar ceria particle | Minor axis breadth (nm) of columnar ceria particle | Concentration (M) of chloroplatinic acid water solution |
|---|---|---|---|
| Ex. 1 | 15 | 250 | 0.15 |
| Ex. 2 | 17 | 150 | 0.15 |
| Ex. 3 | 18 | 240 | 0.15 |
| Ex. 4 | 20 | 245 | 0.15 |
| Ex. 5 | 18 | 240 | 0.90 |
| Ex. 6 | 18 | 240 | 0.10 |
| Ex. 7 | 12 | 200 | 0.15 |
| Ex. 8 | 12 | 200 | 0.15 |
| Ex. 9 | 10 | 170 | 0.15 |

TABLE 5

| Exam. | Calcination temperature (° C.) of electrode active material | Calcination time (hour) of electrode active material | Primary particle diameter (nm) of platinum | Secondary particle diameter (nm) of platinum |
|---|---|---|---|---|
| Ex. 1 | 400 | 2 | 40 | 200 |
| Ex. 2 | 400 | 2 | 45 | 180 |
| Ex. 3 | 450 | 2 | 41 | 190 |
| Ex. 4 | 350 | 2 | 40 | 150 |
| Ex. 5 | 450 | 2 | 40 | 200 |
| Ex. 6 | 450 | 2 | 40 | 190 |
| Ex. 7 | 400 | 2 | 40 | 200 |
| Ex. 8 | 400 | 2 | 40 | 200 |
| Ex. 9 | 400 | 2 | 40 | 200 |

TABLE 6

| Exam. | Electric-current value (milli-ampere) at electric potential of 0.70 V vs. RHE | Onset potential (V vs. RHE) |
|---|---|---|
| Ex. 1 | 7.8 | 0.48 |
| Ex. 2 | 7.6 | 0.49 |
| Ex. 3 | 7.7 | 0.48 |
| Ex. 4 | 7.2 | 0.48 |
| Ex. 5 | 7.7 | 0.49 |
| Ex. 6 | 7.7 | 0.49 |
| Ex. 7 | 8.5 | 0.44 |
| Ex. 8 | 8.6 | 0.43 |
| Ex. 9 | 8.6 | 0.44 |

The term "onset potential" used herein is a value defined based on a potential corresponding to an intersection in the cyclic voltammogram shown in FIG. 4, between: a horizontal straight line drawn from a point on the ordinate at an electric-current value of 0 mA, parallelly to the potential axis (abscissa); and a firstly occurring peak of an applicable plot line.

Comparative Example 1

To attain a composition of 5 wt % Pt/25 wt % $CeO_2$/70 wt % C, 1.0 mole/liter of cerium nitrate (purity 99.99%) and 2.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 800° C. for 2 hours in circulation of oxygen (250 milliliter/minute) to prepare a crystalline ceria powder, which was confirmed to comprise a single crystal phase of fluorite by an X-ray diffraction test, similarly to the data of Example 1 shown in FIG. 1.

The calcinedly obtained powder included, in a coexistent manner, spherical particles having an averaged primary particle diameter of 50 nanometers and an averaged secondary particle diameter of 200 nanometers, and columnar particles having an averaged aspect ratio of 15 and breadths of 250 nanometers or shorter in minor axis directions. The numerical percentage of spherical $CeO_2$ particles based on spherical and columnar $CeO_2$ particles was about 90%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

Since Pt particles in the prepared electrode active material were extremely small and not observable by a SEM, forms of Pt particles on ceria were observed by a transmission electron microscope (TEM). From the observation result of TEM, it was found that Pt particles were brought into nanoparticles having primary particle diameters of 40 nanometers or less and secondary particle diameters of about 200 nanometers.

The thus obtained electrode active material was subjected to an electrode activity evaluation, by conducting cyclic voltammetry at a scanning speed of 50 mV/s for the electrode active material placed in a mixed water solution including an $H_2SO_4$ water solution having a concentration of 0.5 mole/liter and a methanol water solution having a concentration of 0.5 mole/liter.

From the measurement result, there was confirmed a peak of a smaller electric-current value of 1.8 mA exhibiting methanol oxidation at an electric potential of 0.70V vs. RHE, thereby confirming that the anode material obtained in Comparative Example 1 certainly caused conversion of methanol into hydrogen and CO and a conversion reaction of CO as by-product into $CO_2$. However, the anode material had a low activity, thereby confirming that its electrode activity was low.

Also, the onset potential, as an index representing readiness of occurrence of an oxidation reaction of CO, was as high as 0.56 (V vs. RHE), thereby exhibiting a result that oxidation of CO was difficult to start.

The resultant data obtained in Comparative Example 1 are collectively shown in Table 7 through Table 12.

Comparative Example 2

To attain a composition of 30 wt % Pt/50 wt % $CeO_2$/20 wt % C, 1.0 mole/liter of cerium nitrate (purity 99.99%) and 2.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 800° C. for 2 hours in circulation of oxygen (250 milliliter/minute) to prepare a crystalline ceria powder, which was confirmed to comprise a single crystal phase of fluorite by an X-ray diffraction test, similarly to Example 1.

From a SEM observation result of the prepared electrode substance, the calcinedly obtained powder included, in a coexistent manner, spherical particles having an averaged primary particle diameter of 40 nanometers and an averaged secondary particle diameter of 550 nanometers, and columnar particles having an averaged aspect ratio of 17 and breadths of 245 nanometers or shorter in minor axis directions. The numerical percentage of spherical $CeO_2$ particles based on spherical and columnar $CeO_2$ particles was about 90%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation.

The thus obtained precipitation was subjected to a process for washing the precipitation by alcohol and then filtering it, which process was repeated three times, followed by drying for 2 days in circulation of dry nitrogen gas at a rate of 150 milliliter/minute. The obtained electrode active material was calcined at 400° C. for 2 hours within a tubular furnace in circulation of high purity hydrogen (250 milliliter/minute), thereby conducting an activation treatment of a Pt surface. From an observation result of TEM, it was found that Pt particles on ceria of the prepared electrode active material were brought into nanoparticles having primary particle diameters of 45 nanometers and secondary particle diameters of about 180 nanometers.

The thus obtained electrode active material was subjected to an electrode activity evaluation, by conducting cyclic voltammetry under the same conditions as Comparative Example 1. From the measurement result, there was confirmed a peak of a smaller electric-current value of 1.6 mA exhibiting methanol oxidation at an electric potential of 0.70V vs. RHE, thereby confirming that the anode material obtained in Comparative Example 2 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.55 (V vs. RHE), thereby exhibiting a result that oxidation of CO was difficult to start.

The resultant data obtained in Comparative Example 2 are collectively shown in Table 7 through Table 12.

Comparative Example 3

To attain a composition of 30 wt % Pt/5 wt % $CeO_2$/65 wt % C, 2.5 mole/liter of cerium nitrate (purity 99.99%) and 7.5 mole/liter of ammonium hydrogencarbonate water solution (purity 99.5%) were prepared as starting materials, respectively, and the cerium nitrate water solution was dropped into the ammonium hydrogencarbonate water solution heated to 70° C. at a rate of 1 milliliter/minute, to prepare a precipitation. After completion of dropping of the cerium nitrate water solution, maturation was conducted at a temperature of 70° C. for 10 hours.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 500° C. for 6 hours in circulation of oxygen (250 milliliter/minute) to prepare a crystalline ceria powder, which was confirmed to comprise a single crystal phase of fluorite by an X-ray diffraction test, similarly to Example 1.

From a SEM observation result of the prepared electrode substance, the calcinedly obtained powder included, in a coexistent manner, spherical particles having an averaged primary particle diameter of 40 nanometers and an averaged secondary particle diameter of 120 nanometers, and columnar particles having an averaged aspect ratio of 18 and breadths of 240 nanometers or shorter in minor axis directions. The numerical percentage of spherical $CeO_2$ particles based on spherical and columnar $CeO_2$ particles was about 80%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 450° C. for 2 hours within a tubular furnace in circulation of high purity hydrogen (250 milliliter/minute), thereby conducting an activation treatment of a Pt surface.

From an observation result of TEM, it was found that Pt particles on ceria of the prepared electrode active material were brought into nanoparticles having primary particle diameters of 41 nanometers and secondary particle diameters of about 190 nanometers.

The thus obtained electrode active material was subjected to an electrode activity evaluation, by conducting cyclic voltammetry under the same conditions as Comparative Example 1.

From the measurement result, there was confirmed a peak of a smaller electric-current value of 1.9 mA exhibiting methanol oxidation at an electric potential of 0.70V vs. RHE, thereby confirming that the anode material obtained in Comparative Example 3 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.57 (V vs. RHE), thereby exhibiting a result that oxidation of CO was difficult to start.

The resultant data obtained in Comparative Example 3 are collectively shown in Table 7 through Table 12.

Comparative Example 4

To attain a composition of 35 wt % Pt/15 wt % $CeO_2$/50 wt % C, 0.1 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium hydrogencarbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 700° C. for 2 hours in circulation of oxygen (250 milliliter/minute) to prepare a crystalline ceria powder, which was confirmed to comprise a single crystal phase of fluorite by an X-ray diffraction test, similarly to Example 1.

From a SEM observation result of the prepared electrode substance, the calcinedly obtained powder included, in a coexistent manner, spherical particles having an averaged primary particle diameter of 45 nanometers and an averaged secondary particle diameter of 180 nanometers, columnar particles having an averaged aspect ratio of 20 and breadths of 245 nanometers or shorter in minor axis directions, and plate-like ceria particles having an averaged length of about 100 nanometers and an averaged width of about 200 nanometers.

The numerical percentage of spherical $CeO_2$ particles based on spherical, columnar, and plate-like $CeO_2$ particles was about 17%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 350° C. for 2 hours within a tubular furnace in circulation of high purity hydrogen (250 milliliter/minute), thereby conducting an activation treatment of a Pt surface.

From an observation result of TEM, it was found that Pt particles on ceria of the prepared electrode active material were brought into nanoparticles having primary particle diameters of 40 nanometers and secondary particle diameters of about 150 nanometers.

The thus obtained electrode active material was subjected to an electrode activity evaluation, by conducting cyclic voltammetry under the same conditions as Comparative Example 1.

From the measurement result, there was confirmed a peak of a smaller electric-current value of 1.6 mA exhibiting methanol oxidation at an electric potential of 0.70V vs. RHE, thereby confirming that the anode material obtained in Comparative Example 4 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.56 (V vs. RHE), thereby exhibiting a result that oxidation of CO was difficult to start.

The resultant data obtained in Comparative Example 4 are collectively shown in Table 7 through Table 12.

Comparative Example 5

To attain a composition of 35 wt % Pt/15 wt % $CeO_2$/50 wt % C, 5.0 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 700° C. for 2 hours in circulation of oxygen (250 milliliter/minute) to prepare a crystalline ceria powder, which was confirmed to comprise a single crystal phase of fluorite by an X-ray diffraction test, similarly to Example 1.

From a SEM observation result of the prepared electrode substance, the calcinedly obtained powder included, in a coexistent manner, spherical particles having an averaged primary particle diameter of 40 nanometers and an averaged secondary particle diameter of 160 nanometers, and columnar particles having an averaged aspect ratio of 19 and breadths of 245 nanometers or shorter in minor axis directions. The numerical percentage of spherical $CeO_2$ particles based on spherical and columnar $CeO_2$ particles was about 14%, thereby meaning dominant presence of columnar particles.

Next, the ceria nano-powder prepared in this Comparative Example was weighed to meet the above composition formula and dispersed into a mixed solution of: 0.15 mole/liter of prepared chloroplatinic acid water solution; and a solution obtained by dispersing prepared carbon black into distilled water; to thereby substantially disperse applicable three kinds of electrode active materials in the resultant mixed solution; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 450° C. for 2 hours within a tubular furnace in circulation of high purity hydrogen (250 milliliter/minute), thereby conducting an activation treatment of a Pt surface.

From a TEM observation result, it was found that Pt particles on ceria in the prepared electrode active material were brought into nanoparticles having primary particle diameters of 40 nanometers and secondary particle diameters of about 200 nanometers.

The thus obtained electrode active material was subjected to an electrode activity evaluation, by conducting cyclic voltammetry under the same experiment conditions as Comparative Example 1.

From the measurement result, there was confirmed a peak of a smaller electric-current value of 1.1 mA exhibiting methanol oxidation at an electric potential of 0.70V vs. RHE, thereby confirming that the anode material obtained in Comparative Example 5 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.58 (V vs. RHE), thereby exhibiting a result that oxidation of CO was difficult to start.

The resultant data obtained in Comparative Example 5 are collectively shown in Table 7 through Table 12.

Comparative Example 6

To attain a composition of 35 wt % Pt/15 wt % $CeO_2$/50 wt % C, 2.5 mole/liter of cerium nitrate (purity 99.99%) and 15.0 mole/liter of ammonium carbonate water solution (purity 99.5%) were prepared as starting materials, respectively, and the cerium nitrate water solution was dropped into the ammonium carbonate water solution heated to 70° C. at a rate of 1 milliliter/minute, to prepare a precipitation. After completion of dropping of the cerium nitrate water solution, maturation was conducted at a temperature of 70° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 700° C. for 2 hours in circulation of oxygen (250 milliliter/minute) to prepare a crystalline ceria powder, which was confirmed to comprise a single crystal phase of fluorite by an X-ray diffraction test, similarly to Example 1.

From a SEM observation result of the prepared electrode substance, the calcinedly obtained powder included, in a coexistent manner, spherical particles having an averaged primary particle diameter of 40 nanometers and an averaged secondary particle diameter of 170 nanometers, and columnar particles having an averaged aspect ratio of 17 and breadths of 500 nanometers or shorter in minor axis directions. The numerical percentage of spherical $CeO_2$ particles based on spherical and columnar $CeO_2$ particles was about 20%, thereby meaning dominant presence of columnar particles.

Next, the ceria nano-powder prepared in this Comparative Example was weighed to meet the above composition formula and dispersed into a mixed solution of: 0.15 mole/liter of prepared chloroplatinic acid water solution; and a solution obtained by dispersing prepared carbon black into distilled water; to thereby substantially disperse applicable three kinds of electrode active materials in the resultant mixed solution; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

From a TEM observation result, it was found that Pt particles on ceria in the prepared electrode active material were brought into nanoparticles having primary particle diameters of 40 nanometers and secondary particle diameters of about 190 nanometers.

The thus obtained electrode active material was subjected to an electrode activity evaluation, by conducting cyclic voltammetry under the same experiment conditions as Comparative Example 1.

As a result, there was confirmed a peak of a smaller electric-current value of 1.7 mA exhibiting methanol oxidation at an electric potential of 0.70V vs. RHE, thereby confirming that the anode material obtained in Comparative Example 6 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.56 (V vs. RHE), thereby exhibiting a result that oxidation of CO was difficult to start.

The resultant data obtained in Comparative Example 6 are collectively shown in Table 7 through Table 12, similarly to Comparative Example 1.

Comparative Example 7

To attain a composition of 35 wt % Pt/15 wt % $CeO_2$/50 wt % C, 2.5 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium hydrogencarbonate water solution heated to 30° C. at a rate of 1 milliliter/minute, to prepare a precipitation. After completion of dropping of the cerium nitrate water solution, maturation was conducted at a temperature of 30° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 700° C. for 2 hours in circulation of oxygen (250 milliliter/minute) to prepare a crystalline ceria powder, which was confirmed to comprise a single crystal phase of fluorite by an X-ray diffraction test, similarly to Example 1.

From a SEM observation result of the prepared electrode substance, the calcinedly obtained powder included, in a coexistent manner, spherical particles having an averaged primary particle diameter of 40 nanometers and an averaged secondary particle diameter of 490 nanometers, columnar particles having an averaged aspect ratio of 20 and breadths of 250 nanometers or shorter in minor axis directions, and plate-like ceria particles having an averaged length of about 100 nanometers and an averaged width of about 200 nanometers. The numerical percentage of spherical $CeO_2$ particles based on spherical, columnar, and plate-like $CeO_2$ particles was about 17%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

From an observation result of TEM, it was found that Pt particles on ceria of the prepared electrode active material were brought into nanoparticles having primary particle diameters of 40 nanometers and secondary particle diameters of about 190 nanometers.

The thus obtained electrode active material was subjected to an electrode activity evaluation, by conducting cyclic voltammetry under the same conditions as Comparative Example 1.

From the measurement result, there was confirmed a peak of a smaller electric-current value of 1.4 mA exhibiting methanol oxidation at an electric potential of 0.70V vs. RHE, thereby confirming that the anode material obtained in Comparative Example 7 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.56 (V vs. RHE), thereby exhibiting a result that oxidation of CO was difficult to start.

The resultant data obtained in Comparative Example 7 are collectively shown in Table 7 through Table 12.

Comparative Example 8

To attain a composition of 35 wt % Pt/15 wt % $CeO_2$/50 wt % C, 2.5 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium hydrogencarbonate water solution heated to 90° C. at a rate of 1 milliliter/minute, to prepare a precipitation. After completion of dropping of the cerium nitrate water solution, maturation was conducted at a temperature of 90° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 700° C. for 2 hours in circulation of oxygen (250 milliliter/minute) to prepare a crystalline ceria powder, which was confirmed to comprise a single crystal phase of fluorite by an X-ray diffraction test, similarly to Example 1.

From a SEM observation result of the prepared electrode substance, the calcinedly obtained powder included, in a coexistent manner, spherical particles having an averaged primary particle diameter of 40 nanometers and an averaged secondary particle diameter of 420 nanometers, and columnar particles having an averaged aspect ratio of 20 and breadths of 247 nanometers or shorter in minor axis directions. The numerical percentage of spherical $CeO_2$ particles based on spherical and columnar $CeO_2$ particles was about 19%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

From an observation result of TEM, it was found that Pt particles on ceria of the prepared electrode active material were brought into nanoparticles having primary particle diameters of 40 nanometers and secondary particle diameters of about 190 nanometers.

The thus obtained electrode active material was subjected to an electrode activity evaluation, by conducting cyclic voltammetry under the same conditions as Comparative Example 1.

From the measurement result, there was confirmed a peak of a smaller electric-current value of 1.5 mA exhibiting methanol oxidation at an electric potential of 0.70V vs. RHE, thereby confirming that the anode material obtained in Comparative Example 8 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.56 (V vs. RHE), thereby exhibiting a result that oxidation of CO was difficult to start.

The resultant data obtained in Comparative Example 8 are collectively shown in Table 7 through Table 12.

Comparative Example 9

To attain a composition of 35 wt % Pt/15 wt % $CeO_2$/50 wt % C, 2.5 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium hydrogencarbonate water solution heated to 75° C. at a rate of 1 milliliter/minute, to prepare a precipitation.

After completion of dropping of the cerium nitrate water solution, and without conducting maturation at a temperature of 75° C., the thus obtained precipitation was subjected to water washing treatments and filtration alternately repeated three times, followed by drying in a dry nitrogen gas for 2 days, thereby preparing a precursor powder. The precursor powder was subsequently calcined at a temperature of 700° C. for 2 hours in circulation of oxygen (250 milliliter/minute) to prepare a crystalline ceria powder, which was confirmed to comprise a single crystal phase of fluorite by an X-ray diffraction test, similarly to Example 1.

From a SEM observation result of the prepared electrode substance, the calcinedly obtained powder included, in a coexistent manner, spherical particles having an averaged primary particle diameter of 40 nanometers and an averaged secondary particle diameter of 520 nanometers, and columnar particles having an averaged aspect ratio of 23 and breadths of 245 nanometers or shorter in minor axis directions. The numerical percentage of spherical $CeO_2$ particles based on spherical and columnar $CeO_2$ particles was about 60%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

From an observation result of TEM, it was found that Pt particles on ceria of the prepared electrode active material were brought into nanoparticles having primary particle diameters of 40 nanometers and secondary particle diameters of about 190 nanometers.

The thus obtained electrode active material was subjected to an electrode activity evaluation, by conducting cyclic voltammetry under the same conditions as Comparative Example 1.

From the measurement result, there was confirmed a peak of a smaller electric-current value of 2.0 mA exhibiting methanol oxidation at an electric potential of 0.70V vs. RHE, thereby confirming that the anode material obtained in Comparative Example 9 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.55 (V vs. RHE), thereby exhibiting a result that oxidation of CO was difficult to start.

The resultant data obtained in Comparative Example 9 are collectively shown in Table 7 through Table 12.

Comparative Example 10

To attain a composition of 35 wt % Pt/15 wt % $CeO_2$/50 wt % C, 2.5 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium hydrogencarbonate water solution heated to 75° C. at a rate of 1 milliliter/minute, to prepare a precipitation. After completion of dropping of the cerium nitrate water solution, maturation was conducted at a temperature of 75° C. for 72 hours.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 700° C. for 2 hours in circulation of oxygen (250 milliliter/minute) to prepare a crystalline ceria powder, which was confirmed to comprise a single crystal phase of fluorite by an X-ray diffraction test, similarly to Example 1.

From a SEM observation result of the prepared electrode substance, the calcinedly obtained powder included, in a coexistent manner, spherical particles having an averaged primary particle diameter of 40 nanometers and an averaged secondary particle diameter of 560 nanometers, and columnar particles having an averaged aspect ratio of 21 and breadths of 246 nanometers or shorter in minor axis directions. The numerical percentage of spherical $CeO_2$ particles based on spherical and columnar $CeO_2$ particles was about 57%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

From an observation result of TEM, it was found that Pt particles on ceria of the prepared electrode active material were brought into nanoparticles having primary particle diameters of 40 nanometers and secondary particle diameters of about 190 nanometers.

The thus obtained electrode active material was subjected to an electrode activity evaluation, by conducting cyclic voltammetry under the same conditions as Comparative Example 1.

From the measurement result, there was confirmed a peak of a smaller electric-current value of 1.7 mA exhibiting methanol oxidation at an electric potential of 0.70V vs. RHE, thereby confirming that the anode material obtained in Comparative Example 10 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.57 (V vs. RHE), thereby exhibiting a result that oxidation of CO was difficult to start.

The resultant data obtained in Comparative Example 10 are collectively shown in Table 7 through Table 12.

Comparative Example 11

To attain a composition of 35 wt % Pt/15 wt % $CeO_2$/50 wt % C, 2.5 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium hydrogencarbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 200° C. for 2 hours in circulation of oxygen (250 milliliter/minute), and the resultant product was subjected to an X-ray diffraction test to investigate its crystal phase, such that diffraction lines originating from a fluorite structure were not observed while observing a diffraction line considered to be originating from cerium carbonate.

From a SEM observation result of the prepared electrode substance, although the calcinedly obtained powder was not ceria ($CeO_2$), it included, in a coexistent manner, spherical particles having an averaged primary particle diameter of 40 nanometers and an averaged secondary particle diameter of 180 nanometers, and columnar particles having an averaged aspect ratio of 20 and breadths of 245 nanometers or shorter in minor axis directions. The numerical percentage of spherical particles based on spherical and columnar particles was about 85%.

The calcinedly obtained nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

From an observation result of TEM, it was found that Pt particles on ceria of the prepared electrode active material were brought into nanoparticles having primary particle diameters of 40 nanometers and secondary particle diameters of about 190 nanometers.

The thus obtained electrode active material was subjected to an electrode activity evaluation, by conducting cyclic voltammetry under the same conditions as Comparative Example 1.

From the measurement result, there was confirmed a peak of an extremely small electric-current value of 0.1 mA exhibiting methanol oxidation at an electric potential of 0.70V vs. RHE, thereby confirming that the anode material obtained in Comparative Example 11 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.58 (V vs. RHE), thereby exhibiting a result that oxidation of CO was difficult to start.

The resultant data obtained in Comparative Example 11 are collectively shown in Table 7 through Table 12.

Comparative Example 12

To attain a composition of 35 wt % Pt/15 wt % $CeO_2$/50 wt % C, 2.5 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 1,000° C. for 2 hours in circulation of oxygen (250 milliliter/minute) to prepare a crystalline ceria powder, which was confirmed to comprise a single crystal phase of fluorite by an X-ray diffraction test, similarly to Example 1.

From a SEM observation result of the prepared electrode substance, the calcinedly obtained powder included, in a coexistent manner, particle aggregations having an averaged primary particle diameter of 40 nanometers and an averaged secondary particle diameter of 1,200 nanometers, and columnar particles having an averaged aspect ratio of 18 and breadths of 290 nanometers or shorter in minor axis directions. The numerical percentage of aggregated spherical $CeO_2$ particles based on aggregated spherical $CeO_2$ particles and columnar $CeO_2$ particles was about 80%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

From an observation result of TEM, it was found that Pt particles on ceria of the prepared electrode active material were brought into nanoparticles having primary particle diameters of 40 nanometers and secondary particle diameters of about 190 nanometers.

The thus obtained electrode active material was subjected to an electrode activity evaluation, by conducting cyclic voltammetry under the same conditions as Comparative Example 1.

From the measurement result, there was confirmed a peak of a smaller electric-current value of 1.2 mA exhibiting methanol oxidation at an electric potential of 0.70V vs. RHE, thereby confirming that the anode material obtained in Comparative Example 12 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.55 (V vs. RHE), thereby exhibiting a result that oxidation of CO was difficult to start.

The resultant data obtained in Comparative Example 12 are collectively shown in Table 7 through Table 12.

Comparative Example 13

To attain a composition of 35 wt % Pt/15 wt % $CeO_2$/50 wt % C, 2.5 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 700° C. for 2 hours in circulation of oxygen (250 milliliter/minute) to prepare a crystalline ceria powder, which was confirmed to comprise a single crystal phase of fluorite by an X-ray diffraction test, similarly to Example 1.

From a SEM observation result of the prepared electrode substance, the calcinedly obtained powder included, in a coexistent manner, spherical particles having an averaged primary particle diameter of 40 nanometers and an averaged secondary particle diameter of 180 nanometers, and columnar particles having an averaged aspect ratio of 20 and breadths of 245 nanometers or shorter in minor axis directions. The numerical percentage of spherical $CeO_2$ particles based on spherical and columnar $CeO_2$ particles was about 85%.

The ceria nano-powder was dispersed into a mixed solution of: 0.01 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

From an observation result of TEM, it was found that Pt particles on ceria of the prepared electrode active material were brought into nanoparticles having primary particle diameters of 40 nanometers and secondary particle diameters of about 190 nanometers.

The thus obtained electrode active material was subjected to an electrode activity evaluation, by conducting cyclic voltammetry under the same conditions as Comparative Example 1.

From the measurement result, there was confirmed a peak of a smaller electric-current value of 0.3 mA exhibiting methanol oxidation at an electric potential of 0.70V vs. RHE, thereby confirming that the anode material obtained in Comparative Example 13 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.59 (V vs. RHE), thereby exhibiting a result that oxidation of CO was difficult to start.

The resultant data obtained in Comparative Example 13 are collectively shown in Table 7 through Table 12.

Comparative Example 14

To attain a composition of 35 wt % Pt/15 wt % $CeO_2$/50 wt % C, 2.5 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 700° C. for 2 hours in circulation of oxygen (250 milliliter/minute) to prepare a crystalline ceria powder, which was confirmed to comprise a single crystal phase of fluorite by an X-ray diffraction test, similarly to Example 1.

From a SEM observation result of the prepared electrode substance, the calcinedly obtained powder included, in a coexistent manner, spherical particles having an averaged primary particle diameter of 40 nanometers and an averaged secondary particle diameter of 180 nanometers, and columnar particles having an averaged aspect ratio of 20 and breadths of 245 nanometers or shorter in minor axis directions. The numerical percentage of spherical $CeO_2$ particles based on spherical and columnar $CeO_2$ particles was about 85%.

The ceria nano-powder was dispersed into a mixed solution of: 2.0 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface.

From an observation result of TEM, it was found that Pt particles on ceria of the prepared electrode active material were brought into nanoparticles having primary particle diameters of 40 nanometers and secondary particle diameters of about 470 nanometers.

The thus obtained electrode active material was subjected to an electrode activity evaluation, by conducting cyclic voltammetry under the same conditions as Comparative Example 1.

From the measurement result, there was confirmed a peak of a smaller electric-current value of 2.5 mA exhibiting methanol oxidation at an electric potential of 0.70V vs. RHE, thereby confirming that the anode material obtained in Comparative Example 14 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.54 (V vs. RHE), thereby exhibiting a result that oxidation of CO was difficult to start.

The resultant data obtained in Comparative Example 14 are collectively shown in Table 7 through Table 12.

Comparative Example 15

To attain a composition of 35 wt % Pt/15 wt % $CeO_2$/50 wt % C, 2.5 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 700° C. for 2 hours in circulation of oxygen (250 milliliter/minute) to prepare a crystalline ceria powder, which was confirmed to comprise a single crystal phase of fluorite by an X-ray diffraction test, similarly to Example 1.

From a SEM observation result of the prepared electrode substance, the calcinedly obtained powder included, in a coexistent manner, spherical particles having an averaged primary particle diameter of 40 nanometers and an averaged secondary particle diameter of 180 nanometers, and columnar particles having an averaged aspect ratio of 20 and breadths of 245 nanometers or shorter in minor axis directions. The numerical percentage of spherical $CeO_2$ particles based on spherical and columnar $CeO_2$ particles was about 85%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 100° C. for 2 hours within a tubular furnace in circulation of high purity hydrogen (250 milliliter/minute), thereby conducting an activation treatment of a Pt surface.

From an observation result of TEM, it was found that Pt particles on ceria of the prepared electrode active material were brought into nanoparticles having primary particle diameters of 40 nanometers and secondary particle diameters of about 110 nanometers.

The thus obtained electrode active material was subjected to an electrode activity evaluation, by conducting cyclic voltammetry under the same conditions as Comparative Example 1.

From the measurement result, there was confirmed a peak of a smaller electric-current value of 2.3 mA exhibiting methanol oxidation at an electric potential of 0.70V vs. RHE, thereby confirming that the anode material obtained in Comparative Example 15 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.55 (V vs. RHE), thereby exhibiting a result that oxidation of CO was difficult to start.

The resultant data obtained in Comparative Example 15 are collectively shown in Table 7 through Table 12.

Comparative Example 16

To attain a composition of 35 wt % Pt/15 wt % $CeO_2$/50 wt % C, 2.5 mole/liter of cerium nitrate (purity 99.99%) and 7.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation. After completion of dropping of the cerium nitrate water solution, maturation was conducted at a temperature of 75° C. for 1 hour.

The thus obtained precipitation was subjected to water washing treatments and filtration alternately repeated three times, followed by drying in a dry nitrogen gas for 2 days, thereby preparing a precursor powder. The precursor powder was subsequently calcined at a temperature of 700° C. for 2 hours in circulation of oxygen (250 milliliter/minute) to prepare a crystalline ceria powder, which was confirmed to comprise a single crystal phase of fluorite by an X-ray diffraction test, similarly to Example 1.

From a SEM observation result of the prepared electrode substance, the calcinedly obtained powder included, in a coexistent manner, spherical particles having an averaged primary particle diameter of 40 nanometers and an averaged secondary particle diameter of 180 nanometers, and columnar particles having an averaged aspect ratio of 20 and breadths of 245 nanometers or shorter in minor axis directions. The numerical percentage of spherical $CeO_2$ particles based on spherical and columnar $CeO_2$ particles was about 85%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 700° C. for 2 hours within a tubular furnace in circulation of high purity hydrogen (250 milliliter/minute), thereby conducting an activation treatment of a Pt surface. From an observation result of TEM, it was found that Pt particles on ceria of the prepared electrode active material were brought into particle aggregations having primary particle diameters of 40 nanometers and secondary particle diameters of about 820 nanometers.

The thus obtained electrode active material was subjected to an electrode activity evaluation, by conducting cyclic voltammetry under the same conditions as Comparative Example 1.

From the measurement result, there was confirmed a peak of a smaller electric-current value of 1.1 mA exhibiting methanol oxidation at an electric potential of 0.70V vs. RHE, thereby confirming that the anode material obtained in Comparative Example 16 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.57 (V vs. RHE), thereby exhibiting a result that oxidation of CO was difficult to start.

The resultant data obtained in Comparative Example 16 are collectively shown in Table 7 through Table 12.

Comparative Example 17

For comparison, there was adopted an anode material (made by ISHIFUKU Metal Industry Co., Ltd.) commercially available as having a composition of 30 wt % Pt/15 wt % Ru/55 wt % C, and this electrode active material was calcined at 400° C. for 2 hours within a tubular furnace in circulation of high purity hydrogen (250 milliliter/minute), thereby conducting an activation treatment of Pt surface.

From a TEM observation result of the prepared electrode active material, it was found that Pt particles on ceria in the electrode active material were brought into nanoparticles having an averaged primary particle diameter of about 10 nanometers and an averaged secondary particle diameter of about 90 nanometers.

The thus obtained electrode active material was subjected to an electrode activity evaluation, by conducting cyclic voltammetry under the same conditions as Comparative Example 1.

From the measurement result, there was confirmed a peak of an electric-current value of 2.1 mA exhibiting methanol oxidation at an electric potential of 0.70V vs. RHE (see FIG. 4), and the onset potential, as an index representing readiness of occurrence of an oxidation reaction of CO, was as high as 0.53 (V vs. RHE). Thus, although the anode material obtained in Comparative Example 17 certainly caused conversion of methanol into hydrogen and CO as well as a conversion reaction of CO as by-product into $CO_2$, the anode material had an activity which was not necessarily sufficient.

Comparative Example 18

To attain a composition of 30 wt % Pt/50 wt % $CeO_2$/20 wt % C, 1.0 mole/liter of cerium nitrate (purity 99.99%) and 2.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation.

After completion of dropping of the cerium nitrate water solution, maturation was conducted at a temperature of 75° C. for 1 hour. The thus obtained precipitation was subjected to water washing treatments and filtration alternately repeated three times, followed by drying in a dry nitrogen gas for 2 days, thereby preparing a precursor powder. The precursor powder was subsequently subjected to a heat treatment at a temperature of 100° C. for 15 hours, then heated to 800° C. without temperature fall, and calcined for 2 hours at 800° C., in circulation of oxygen (250 milliliter/minute), to prepare a crystalline ceria powder, which was confirmed to comprise a single crystal phase of fluorite similarly to Example 1 by an X-ray diffraction test.

From a SEM observation result of the prepared electrode substance, the calcinedly obtained powder included, in a coexistent manner, spherical particles having an averaged primary particle diameter of 40 nanometers and an averaged secondary particle diameter of 550 nanometers, and columnar particles having an averaged aspect ratio of 17 and breadths of 245 nanometers or shorter in minor axis directions. The numerical percentage of spherical $CeO_2$ particles based on spherical and columnar $CeO_2$ particles was about 90%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation.

The thus obtained precipitation was subjected to a process for washing the precipitation by alcohol and then filtering it, which process was repeated three times, followed by drying for 2 days in circulation of dry nitrogen gas at a rate of 150 milliliter/minute. The obtained electrode active material was calcined at 400° C. for 2 hours within a tubular furnace in circulation of high purity hydrogen (250 milliliter/minute), thereby conducting an activation treatment of a Pt surface.

From an observation result of TEM, it was found that Pt particles on ceria of the prepared electrode active material were brought into nanoparticles having primary particle diameters of 45 nanometers and secondary particle diameters of about 180 nanometers. The thus obtained electrode active material was subjected to an electrode activity evaluation, by conducting cyclic voltammetry under the same conditions as Comparative Example 1.

From the measurement result, there was confirmed a peak of a smaller electric-current value of 1.6 mA exhibiting methanol oxidation at an electric potential of 0.70V vs. RHE, thereby confirming that the anode material obtained in Comparative Example 18 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.55 (V vs. RHE), thereby exhibiting a result that oxidation of CO was difficult to start.

The resultant data obtained in Comparative Example 18 are collectively shown in Table 7 through Table 12.

Comparative Example 19

To attain a composition of 30 wt % Pt/50 wt % $CeO_2$/20 wt % C, 1.0 mole/liter of cerium nitrate (purity 99.99%) and 2.5 mole/liter of ammonium carbonate water solution (purity 99.5%) were prepared as starting materials, respectively, and the cerium nitrate water solution was dropped into the ammonium carbonate water solution heated to 75° C. at a rate of 1 milliliter/minute, to prepare a precipitation.

After completion of dropping of the cerium nitrate water solution, maturation was conducted at a temperature of 75° C. for 1 hour. The thus obtained precipitation was subjected to water washing treatments and filtration alternately repeated three times, followed by drying in a dry nitrogen gas for 2 days, thereby preparing a precursor powder. The precursor powder was subsequently subjected to a heat treatment at a temperature of 180° C. for 6 minutes, then heated to 800° C. without temperature fall, and calcined for 2 hours at 800° C., in circulation of oxygen (250 milliliter/minute), to prepare a crystalline ceria powder, which was confirmed to comprise a single crystal phase of fluorite similarly to Example 1 by an X-ray diffraction test.

From a SEM observation result of the prepared electrode substance, the calcinedly obtained powder included, in a coexistent manner, spherical particles having an averaged primary particle diameter of 40 nanometers and an averaged secondary particle diameter of 550 nanometers, and columnar particles having an averaged aspect ratio of 17 and breadths of 245 nanometers or shorter in minor axis directions. The numerical percentage of spherical $CeO_2$ particles based on spherical and columnar $CeO_2$ particles was about 90%.

The ceria nano-powder was dispersed into a mixed solution of: 0.15 mole/liter of chloroplatinic acid water solution; and a solution obtained by dispersing carbon black into distilled water; and the mixed solution was stirred for 2 hours by a magnetic stirrer, followed by filtration by a suction filter to obtain a precipitation. The thus obtained precipitation was subjected to a process for washing the precipitation by alcohol and then filtering it, which process was repeated three times, followed by drying for 2 days in circulation of dry nitrogen gas at a rate of 150 milliliter/minute.

The obtained electrode active material was calcined at 400° C. for 2 hours within a tubular furnace in circulation of high purity hydrogen (250 milliliter/minute), thereby conducting an activation treatment of a Pt surface. From an observation result of TEM, it was found that Pt particles on ceria of the prepared electrode active material were brought into nanoparticles having primary particle diameters of 45 nanometers and secondary particle diameters of about 180 nanometers.

The thus obtained electrode active material was subjected to an electrode activity evaluation, by conducting cyclic voltammetry under the same conditions as Comparative Example 1. From the measurement result, there was confirmed a peak of a smaller electric-current value of 1.6 mA exhibiting methanol oxidation at an electric potential of 0.70V vs. RHE, thereby confirming that the anode material obtained in Comparative Example 1 certainly caused conversion of methanol into hydrogen and CO and a conversion reaction of CO as by-product into $CO_2$. However, the anode material had a low activity, thereby confirming that its electrode activity was low. Also, the onset potential, as an index representing readiness of occurrence of an oxidation reaction of CO, was as high as 0.55 (V vs. RHE), thereby exhibiting a result that oxidation of CO was difficult to start.

The resultant data obtained in Comparative Example 19 are collectively shown in Table 7 through Table 12.

TABLE 7

| Com. Exam. | Electrode Composition | Concentration of cerium nitrate (M) | Concentration of ammonium carbonate or ammonium hydrogencarbonate aqueous solution (M) |
| --- | --- | --- | --- |
| Com. Ex. 1 | 5 wt % Pt/25 wt % $CeO_2$/70 wt % C | 1.0 | 2.5 |
| Com. Ex. 2 | 30 wt % Pt/50 wt % $CeO_2$/20 wt % C | 1.0 | 2.5 |
| Com. Ex. 3 | 30 wt % Pt/5 wt % $CeO_2$/65 wt % C | 2.5 | 7.5 |
| Com. Ex. 4 | 35 wt % Pt/15 wt % $CeO_2$/50 wt % C | 0.1 | 7.5 |

TABLE 7-continued

| Com. Exam. | Electrode Composition | Concentration of cerium nitrate (M) | Concentration of ammonium carbonate or ammonium hydrogencarbonate aqueous solution (M) |
|---|---|---|---|
| Com. Ex. 5 | 35 wt % Pt/15 wt % $CeO_2$/50 wt % C | 5.0 | 7.5 |
| Com. Ex. 6 | 35 wt % Pt/15 wt % $CeO_2$/50 wt % C | 2.5 | 15.0 |
| Com. Ex. 7 | 35 wt % Pt/15 wt % $CeO_2$/50 wt % C | 2.5 | 7.5 |
| Com. Ex. 8 | 35 wt % Pt/15 wt % $CeO_2$/50 wt % C | 2.5 | 7.5 |
| Com. Ex. 9 | 35 wt % Pt/15 wt % $CeO_2$/50 wt % C | 2.5 | 7.5 |
| Com. Ex. 10 | 35 wt % Pt/15 wt % $CeO_2$/50 wt % C | 2.5 | 7.5 |
| Com. Ex. 11 | 35 wt % Pt/15 wt % $CeO_2$/50 wt % C | 2.5 | 7.5 |
| Com. Ex. 12 | 35 wt % Pt/15 wt % $CeO_2$/50 wt % C | 2.5 | 7.5 |
| Com. Ex. 13 | 35 wt % Pt/15 wt % $CeO_2$/50 wt % C | 2.5 | 7.5 |
| Com. Ex. 14 | 35 wt % Pt/15 wt % $CeO_2$/50 wt % C | 2.5 | 7.5 |
| Com. Ex. 15 | 35 wt % Pt/15 wt % $CeO_2$/50 wt % C | 2.5 | 7.5 |
| Com. Ex. 16 | 35 wt % Pt/15 wt % $CeO_2$/50 wt % C | 2.5 | 7.5 |
| Com. Ex. 17 | 30 wt % Pt/15 wt % Ru/55 wt % C | N/A | N/A |
| Com. Ex. 18 | 30 wt % Pt/50 wt % $CeO_2$/20 wt % C | 1.0 | 2.5 |
| Com. Ex. 19 | 30 wt % Pt/50 wt % $CeO_2$/20 wt % C | 1.0 | 2.5 |

TABLE 8

| Com. Ex. | Maturation temp. (° C.) | Maturation time (hour) | Heat treatment temp. (° C.) of ceria precursor | Heat treatment time (hour) of ceria precursor | Calcination temp. (° C.) of ceria precursor | Calcination time (hour) of ceria precursor |
|---|---|---|---|---|---|---|
| Com. Ex. 1 | 75 | 1 | undone | 0 | 800 | 2 |
| Com. Ex. 2 | 75 | 1 | undone | 0 | 800 | 2 |
| Com. Ex. 3 | 70 | 10 | undone | 0 | 500 | 6 |
| Com. Ex. 4 | 75 | 1 | undone | 0 | 700 | 2 |
| Com. Ex. 5 | 75 | 1 | undone | 0 | 700 | 2 |
| Com. Ex. 6 | 70 | 1 | undone | 0 | 700 | 2 |
| Com. Ex. 7 | 30 | 1 | undone | 0 | 700 | 2 |
| Com. Ex. 8 | 90 | 1 | undone | 0 | 700 | 2 |
| Com. Ex. 9 | 75 | 0 | undone | 0 | 700 | 2 |
| Com. Ex. 10 | 75 | 72 | undone | 0 | 700 | 2 |
| Com. Ex. 11 | 75 | 1 | undone | 0 | 200 | 2 |
| Com. Ex. 12 | 75 | 1 | undone | 0 | 1000 | 2 |
| Com. Ex. 13 | 75 | 1 | undone | 0 | 700 | 2 |
| Com. Ex. 14 | 75 | 1 | undone | 0 | 700 | 2 |
| Com. Ex. 15 | 75 | 1 | undone | 0 | 700 | 2 |
| Com. Ex. 16 | 75 | 1 | undone | 0 | 700 | 2 |
| Com. Ex. 17 | N/A | N/A | N/A | N/A | N/A | N/A |
| Com. Ex. 18 | 75 | 1 | 100 | 15 | 800 | 2 |
| Com. Ex. 19 | 75 | 1 | 180 | 0.1 | 800 | 2 |

TABLE 9

| Com. Ex. | Crystal phase of ceria | Primary particle diameter (nm) of ceria | Secondary particle diameter (nm) of ceria | Percentage of spherical ceria particle (%) |
|---|---|---|---|---|
| Com. Ex. 1 | Fluorite structure | 50 | 200 | 90 |
| Com. Ex. 2 | Fluorite structure | 40 | 550 | 90 |
| Com. Ex. 3 | Fluorite structure | 40 | 120 | 80 |
| Com. Ex. 4 | Fluorite structure | 45 | 180 | 17 |
| Com. Ex. 5 | Fluorite structure | 40 | 160 | 14 |
| Com. Ex. 6 | Fluorite structure | 40 | 170 | 20 |
| Com. Ex. 7 | Fluorite structure | 40 | 490 | 17 |
| Com. Ex. 8 | Fluorite structure | 40 | 420 | 19 |
| Com. Ex. 9 | Fluorite structure | 40 | 520 | 60 |
| Com. Ex. 10 | Fluorite structure | 40 | 560 | 57 |
| Com. Ex. 11 | Fluorite structure was unrecognizable | (40) | (180) | (85) |
| Com. Ex. 12 | Fluorite structure | 40 | 1,200 | 80 |
| Com. Ex. 13 | Fluorite structure | 40 | 180 | 85 |
| Com. Ex. 14 | Fluorite structure | 40 | 180 | 85 |
| Com. Ex. 15 | Fluorite structure | 40 | 180 | 85 |
| Com. Ex. 16 | Fluorite structure | 40 | 180 | 85 |
| Com. Ex. 17 | — | — | — | — |
| Com. Ex. 18 | Fluorite structure | 40 | 550 | 90 |
| Com. Ex. 19 | Fluorite structure | 40 | 550 | 90 |

*Values of Comparative Example 11 were listed as reference values in brackets, because ceria was not crystallized.

TABLE 10

| Com. Ex. | Aspect ratio of columnar ceria particle | Minor axis breadth (nm) of columnar ceria particle | Concentration (M) of chloroplatinic acid water solution |
|---|---|---|---|
| Com. Ex. 1 | 15 | 250 | 0.15 |
| Com. Ex. 2 | 17 | 245 | 0.15 |
| Com. Ex. 3 | 18 | 240 | 0.15 |
| Com. Ex. 4 | 20 | 245 | 0.15 |
| Com. Ex. 5 | 19 | 245 | 0.15 |
| Com. Ex. 6 | 17 | 500 | 0.15 |
| Com. Ex. 7 | 20 | 250 | 0.15 |
| Com. Ex. 8 | 20 | 247 | 0.15 |
| Com. Ex. 9 | 23 | 245 | 0.15 |
| Com. Ex. 10 | 21 | 246 | 0.15 |
| Com. Ex. 11 | 20 | 245 | 0.15 |
| Com. Ex. 12 | 18 | 290 | 0.15 |
| Com. Ex. 13 | 20 | 245 | 0.01 |
| Com. Ex. 14 | 20 | 245 | 2.0 |
| Com. Ex. 15 | 20 | 245 | 0.15 |
| Com. Ex. 16 | 20 | 245 | 0.15 |
| Com. Ex. 17 | — | — | — |
| Com. Ex. 18 | 17 | 245 | 0.15 |
| Com. Ex. 19 | 17 | 245 | 0.15 |

TABLE 11

| Com. Ex. | Calcination temperature (° C.) of electrode active material | Calcination time (hour) of electrode active material | Primary particle diameter (nm) of platinum | Secondary particle diameter (nm) of platinum |
|---|---|---|---|---|
| Com. Ex. 1 | 400 | 2 | 40 | 200 |
| Com. Ex. 2 | 400 | 2 | 45 | 180 |
| Com. Ex. 3 | 450 | 2 | 41 | 190 |
| Com. Ex. 4 | 350 | 2 | 40 | 150 |
| Com. Ex. 5 | 450 | 2 | 40 | 200 |
| Com. Ex. 6 | 400 | 2 | 40 | 190 |
| Com. Ex. 7 | 400 | 2 | 40 | 190 |
| Com. Ex. 8 | 400 | 2 | 40 | 190 |
| Com. Ex. 9 | 400 | 2 | 40 | 190 |
| Com. Ex. 10 | 400 | 2 | 40 | 190 |
| Com. Ex. 11 | 400 | 2 | 40 | 190 |
| Com. Ex. 12 | 400 | 2 | 40 | 190 |
| Com. Ex. 13 | 400 | 2 | 40 | 190 |
| Com. Ex. 14 | 400 | 2 | 40 | 470 |
| Com. Ex. 15 | 100 | 2 | 40 | 110 |
| Com. Ex. 16 | 700 | 2 | 40 | 820 |
| Com. Ex. 17 | 400 | 2 | 10 | 90 |
| Com. Ex. 18 | 400 | 2 | 45 | 180 |
| Com. Ex. 19 | 400 | 2 | 45 | 180 |

TABLE 12

| Com. Ex. | Electric-current value (milli-ampere) at electric potential of 0.70 V vs. RHE | Onset potential (V vs. RHE) |
|---|---|---|
| Com. Ex. 1 | 1.8 | 0.56 |
| Com. Ex. 2 | 1.6 | 0.55 |
| Com. Ex. 3 | 1.9 | 0.57 |
| Com. Ex. 4 | 1.6 | 0.56 |
| Com. Ex. 5 | 1.1 | 0.58 |
| Com. Ex. 6 | 1.7 | 0.56 |
| Com. Ex. 7 | 1.4 | 0.56 |
| Com. Ex. 8 | 1.5 | 0.56 |
| Com. Ex. 9 | 2.0 | 0.55 |
| Com. Ex. 10 | 1.7 | 0.57 |
| Com. Ex. 11 | 0.1 | 0.58 |

TABLE 12-continued

| Com. Ex. | Electric-current value (milli-ampere) at electric potential of 0.70 V vs. RHE | Onset potential (V vs. RHE) |
|---|---|---|
| Com. Ex. 12 | 1.2 | 0.55 |
| Com. Ex. 13 | 0.3 | 0.59 |
| Com. Ex. 14 | 2.5 | 0.54 |
| Com. Ex. 15 | 2.3 | 0.55 |
| Com. Ex. 16 | 1.1 | 0.57 |
| Com. Ex. 17 | 2.1 | 0.53 |
| Com. Ex. 18 | 1.6 | 0.55 |
| Com. Ex. 19 | 1.6 | 0.55 |

The term "onset potential" used herein is a value defined based on a potential corresponding to an intersection in the cyclic voltammogram shown in FIG. 4, between: a horizontal straight line drawn from a point on the ordinate at an electric-current value of 0 mA, parallelly to the potential axis (abscissa); and a firstly occurring peak of an applicable plot line.

Comparing the above Examples and Comparative Examples with one another, it has been clarified that the anode material defined by the general formula recited in the claims of the present application, where the averaged particle diameters, forms, and aspect ratios of the electrode active materials have values in the specific ranges, respectively, have extremely higher electrode activities as compared with those outside the ranges. Namely, according to the above data, the respective requirement items defined in the claims can be regarded as defining particularly significant items.

INDUSTRIAL APPLICABILITY

Recently, there has been emphasized decrease of carbon dioxide as part of countermeasure against global warming, while small-sized and high output fuel cells have been and are being vigorously developed.

Necessary and indispensable for developing such fuel cells, are investigation and development of fuel cell-oriented solid electrolytes which exhibit higher outputs in a temperature range between 500° C. and 700° C. To exactly meet such needs, the present invention provides a solid electrolyte made of ceria based sintered body exhibiting a larger electrical conductivity at a temperature of 700° C., which is expected to be utilized to a great extent from now on.

Since the solid electrolyte made of ceria based sintered body of the present invention having a larger electrical conductivity has been subjected to success of development after obtaining new knowledges at a nano-level based on extremely diversified and basic standpoints, there is guaranteed an extremely stabilized quality thereof, and the solid electrolyte is expected to be provided and utilized as excellent one not only in fuel cells but also in various technical fields from now on.

Particularly, since the solid electrolyte of the present invention is excellent in heat resistance, the solid electrolyte has a wider utilization field and is expected to progress to creation of novel industry.

The invention claimed is:

1. A polymer fuel cell-oriented Pt/CeO$_2$/electroconductive carbon type nano-hetero anode material characterized in that the nano-hetero anode material is represented by a general formula:

$$X*Pt/Y*CeO_2/Z*CARBON$$

(where X, Y, and Z are content ratios by weight of platinum Pt, CeO$_2$, and CARBON; $0.1 \leq X \leq 0.4$, $0.1 \leq Y \leq 0.4$, and $Z=1-X-Y$; and CARBON represents electroconductive carbon); and that the nano-hetero anode material comprises:

an undoped CeO$_2$ powder including nano-size particles free of components such as rare earth elements dissolved therein in a solid state, wherein the nano-size particles have primary particle diameters between 10 nanometers inclusive and 50 nanometers inclusive and secondary particle diameters between 60 nanometers inclusive and 300 nanometer inclusive, wherein a numerical percentage of spherical particles based on spherical and columnar particles is 50% or more, and wherein the columnar particles have aspect ratios of 20 or less and breadths of 300 nanometers or shorter in minor axis directions;

platinum particles having primary particle diameters of 50 nanometers or less and secondary particle diameters of 300 nanometers or less; and electroconductive carbon as a balance component.

2. A production method of a polymer fuel cell-oriented Pt/CeO$_2$/electroconductive carbon type nano-hetero anode material characterized in that the method comprises the steps of:

in order to attain the nano-hetero anode material having a composition formula:

$$X*Pt/Y*CeO_2/Z*CARBON$$

(where X, Y, and Z are content ratios by weight of platinum Pt, CeO$_2$, and CARBON; $0.1 \leq X \leq 0.4$, $0.1 \leq Y \leq 0.4$, and $Z=1-X-Y$; and CARBON represents electroconductive carbon);

firstly preparing a cerium nitrate water solution (having a concentration between 0.5 mole/liter (M) inclusive and 3 mole/liter (M) inclusive), and dropping the water solution into an ammonium carbonate or ammonium hydrogencarbonate water solution (having a concentration between 0.5 mole/liter (M) inclusive and 9 mole/liter (M) inclusive, in either case) heated to a temperature between 50° C. inclusive and 80° C. inclusive, to prepare ceria precursors in the mixed water solution;

holding the mixed water solution for a period of time between 30 minutes inclusive and 48 hours inclusive to separate a ceria precursor powder as solid from liquid, washing the ceria precursor powder in water and then drying it, and calcining the ceria precursor powder at a temperature between 400° C. inclusive and 900° C. inclusive in circulation of oxygen to prepare a crystalline ceria nano-powder; and mixing the obtained ceria nano-powder with a chloroplatinic acid (H$_2$PtCl$_6$.6H$_2$O) water solution (having a concentration between 0.05 mole/liter (M) inclusive and 1 mole/liter (M) inclusive) and an electroconductive carbon fine powder, drying the mixture by evaporating the solvent in the mixture in circulation of inert gas to obtain a product, and calcining the product at a temperature between 300° C. inclusive and 500° C. inclusive in circulation of hydrogen.

3. A production method of a polymer fuel cell-oriented Pt/CeO$_2$/electroconductive carbon type nano-hetero anode material characterized in that the method comprises the steps of:

in order to attain the nano-hetero anode material having a composition formula:

X*Pt/Y*CeO$_2$/Z*CARBON (where X, Y, and Z are content ratios by weight of platinum Pt, CeO$_2$, and CARBON; $0.1 \leq X \leq 0.4$, $0.1 \leq Y \leq 0.4$, and $Z=1-X-Y$; and CARBON represents electroconductive carbon);

firstly preparing a cerium nitrate water solution (having a concentration between 0.5 mole/liter (M) inclusive and 3 mole/liter (M) inclusive), and dropping the water solution into an ammonium carbonate or ammonium hydrogencarbonate water solution (having a concentration between 0.5 mole/liter (M) inclusive and 9 mole/liter (M) inclusive, in either case) heated to a temperature between 50° C. inclusive and 80° C. inclusive, to prepare ceria precursors in the mixed water solution;

holding the mixed water solution for a period of time between 30 minutes inclusive and 48 hours inclusive to separate a ceria precursor powder as solid from liquid, washing the ceria precursor powder in water and then drying it, heat treating the ceria precursor powder within a temperature range between 150° C. inclusive and 300° C. inclusive for a period of time between 1 hour inclusive and 20 hours inclusive, and calcining the heat-treated powder at a temperature between 400° C. inclusive and 900° C. inclusive in circulation of oxygen to prepare a crystalline ceria nano-powder; and mixing the obtained ceria powder with platinum and an electroconductive carbon fine powder, to lower an onset potential in an anode reaction.

* * * * *